United States Patent [19]

Mutaguchi et al.

[11] Patent Number: 5,713,163
[45] Date of Patent: Feb. 3, 1998

[54] VIBRATION DAMPING APPARATUS

[75] Inventors: Masao Mutaguchi, Yotsukaido; Kiyosi Kawase; Koji Tanida, both of Yokohama; Takenori Otsuka, Oume; Tamotsu Murata, Kawasaki; Yoshinobu Hiranishi, Chiba; Ichiro Tokumura, Funabashi, all of Japan

[73] Assignees: Ishikawajima-Harima Heavy Industries Co. Ltd.; Nippon Cable Co., Ltd., both of Tokyo, Japan

[21] Appl. No.: 586,080

[22] Filed: Jan. 16, 1996

[51] Int. Cl.$^6$ .................. E04B 1/98; E07D 27/34
[52] U.S. Cl. .................. 52/167.1; 52/167.2; 114/121; 114/122; 114/124
[58] Field of Search ............... 52/167.1, 167.2; 114/121, 122, 124

[56] References Cited

U.S. PATENT DOCUMENTS

| | | | |
|---|---|---|---|
| 3,110,464 | 11/1963 | Baratoff et al. | 52/167.2 |
| 3,809,000 | 5/1974 | Horsford | 114/124 |
| 3,934,534 | 1/1976 | Larsh | 114/122 |
| 4,679,521 | 7/1987 | Butka | 114/124 |
| 4,681,053 | 7/1987 | Butka | 114/124 X |
| 5,025,599 | 6/1991 | Ishii | 52/167.2 |
| 5,103,605 | 4/1992 | Sul | 52/167.1 |
| 5,442,883 | 8/1995 | Nishimura et al. | 52/167.2 |
| 5,447,001 | 9/1995 | Nishimura et al. | 52/167.2 |

FOREIGN PATENT DOCUMENTS

| | | | |
|---|---|---|---|
| 4339976 | 11/1992 | Japan | 52/167.2 |
| 9425687 | 11/1994 | WIPO | 52/167.1 |

*Primary Examiner*—Wynn E. Wood
*Attorney, Agent, or Firm*—Rader Fishman & Grauer PLLC

[57] ABSTRACT

A vibration damping apparatus includes a frame having a rail member and end plates at longitudinal ends of the rail member. The frame is a hollow box-shaped element or a hollow tubular element. The rail member defines a downwardly arcuate surface. The frame is fixed on a vibrant structure. A vibration damping body is movably located on the rail member such that it can naturally oscillate thereon upon vibrations of the structure. An energy of vibration of the structure is transferred to and absorbed by the damping body so that the vibration of the structure is attenuated. By appropriately determining a radius of curvature of the rail member, a natural period of the damping body is set to be equal to that of the structure. First and second magnets are mounted on the end plates and third and fourth magnets are mounted on opposite end faces of the damping body. The first and third magnets have the same polarity and the second and fourth magnets have the same polarity. Therefore, a repulsive force is generated when the first and third magnets approach each other or when the second and fourth magnets approach each other. Consequently, collision between the damping body and the frame ends is prevented.

40 Claims, 14 Drawing Sheets

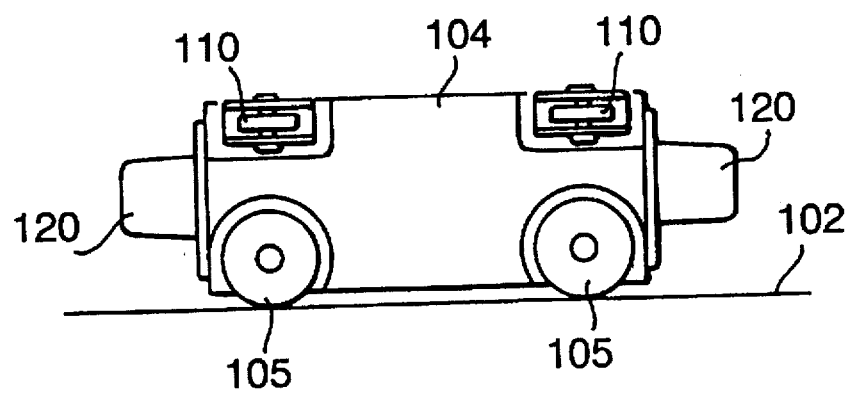
FIG. 4
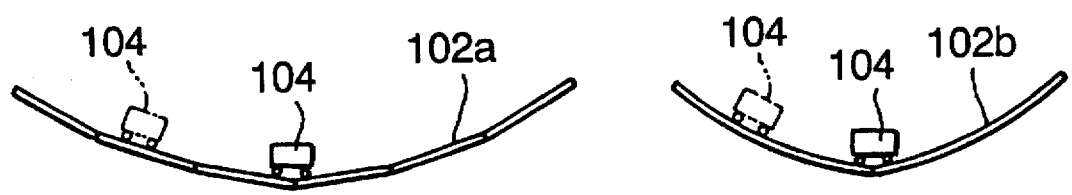
FIG. 5A
FIG. 5B
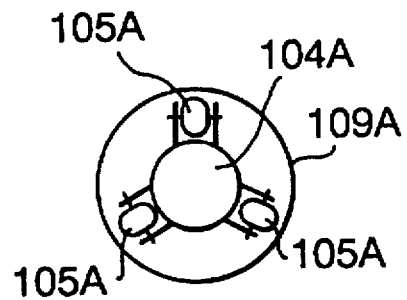
FIG. 5C

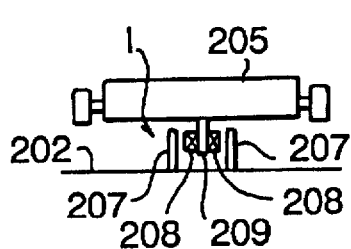
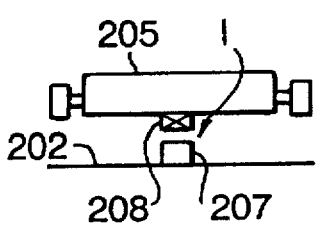
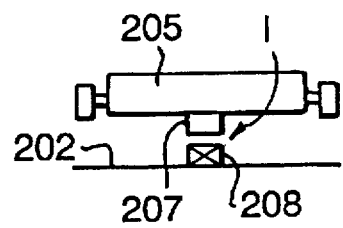
FIG. 7A  FIG. 7B  FIG. 7C
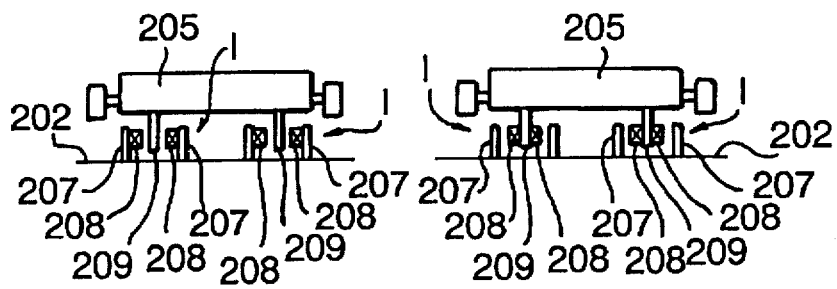
FIG. 7D  FIG. 7E
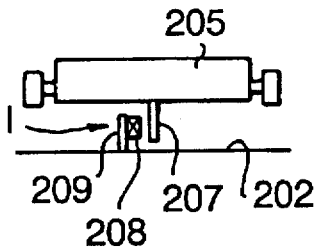
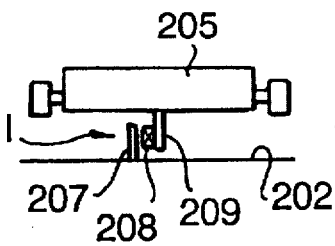
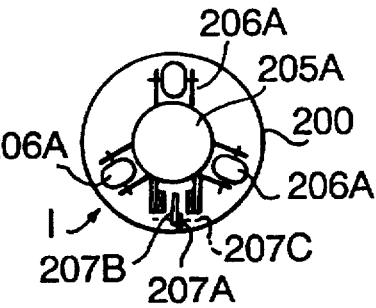
FIG. 7F  FIG. 7G  FIG. 7H
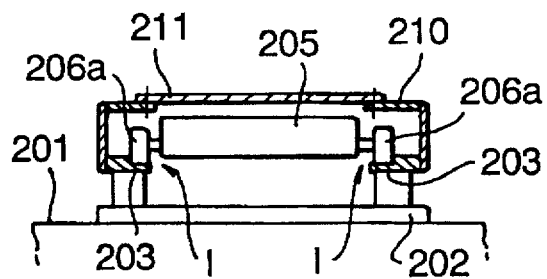
FIG. 8

RELATION BETWEEN DAMPING APPARATUS (WEIGHT), BOAT (STRUCTURE) AND WAVE (EXTERNAL FORCE)

—— WAVE (EXTERNAL FORCE)
---- BOAT (STRUCTURE)
—·— DAMPING APPARATUS (WEIGHT)

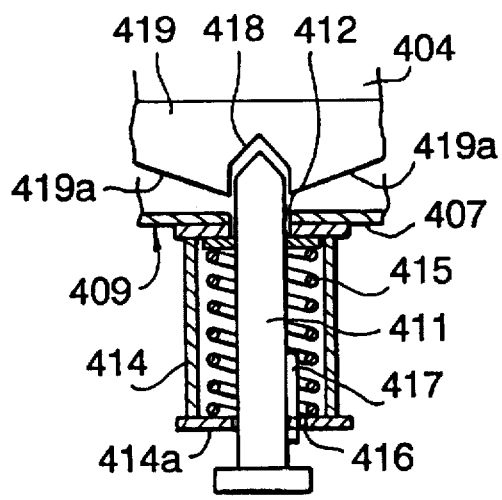
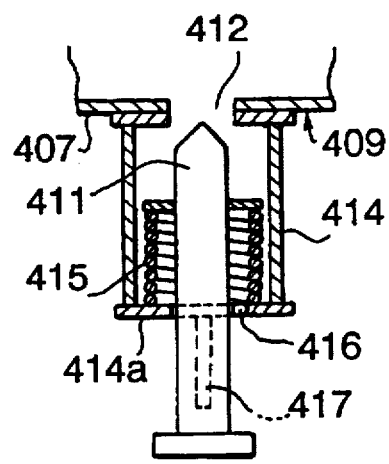
FIG. 23A  FIG. 23B
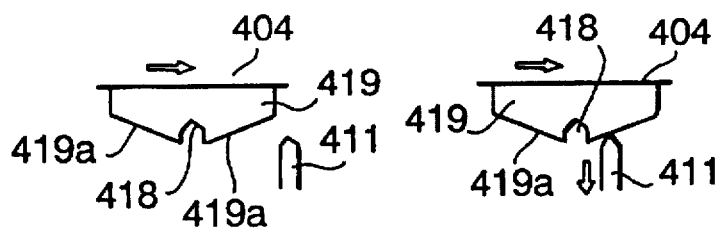
FIG. 24A  FIG. 24B  FIG. 24C
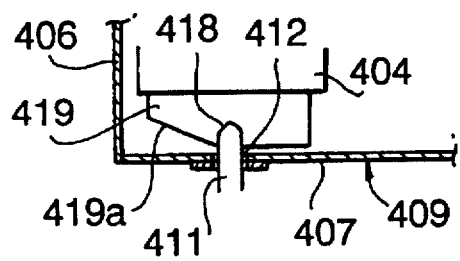
FIG. 25

VIBRATION DAMPING APPARATUS

BACKGROUND OF THE INVENTION

1. Technical Field

The present invention relates to passive vibration damping apparatuses used for any structures on the ground, on the water, on a ropeway or in the air such as houses, buildings, bridges, boats, ships, gondolas and ropeway cars.

2. Background Art

One example of vibration damping apparatuses is disclosed in Japanese Patent Application Publication No. 62-62036 and its schematic arrangement is shown in FIG. 29 of the accompanying drawings. Referring to FIG. 29, a rail(b) is placed on a top of a structure (a) such as a building, and the rail extends in a direction in which the building possibly vibrates. A weight or damping mass (c) having wheels (d) rides on the rail. Between one end face of the weight (c) and a bracket (e) standing on the building (a) at a certain distance from the weight (c), provided are a spring (f) for adjusting a natural period of the weight (c) to that of the building (a) and a hydraulic damper (h) for preventing an excessive movement of the weight (c). This damping apparatus reduces the vibration of the building (c) by taking advantages of reciprocal movement of the weight (c) on the rail (b). Stops (i) are provided on longitudinal ends of the rail (b) to prevent the weight (c) from jumping off the rail (b). The stops (i) also restrict the stroke of reciprocal movement of the weight (c). The weight (c) naturally moves right and left upon vibrations of the building (a). Generally, a vibration damping apparatus having a damping mass which is not forced to move by a separate mechanism is referred to as a passive vibration damping apparatus.

This vibration damping apparatus generally functions satisfactorily. However, since the vibration damping apparatus shown in FIG. 29 uses a mechanical member (i.e., the spring (f)) to conform the natural period of the weight (c) with that of the building (a), it is difficult to set the natural period of the vibration damping apparatus. In addition, the maximum stroke of the reciprocal movement of the weight (c) is limited by the spring (f) and the dash pot (h) so that the vibration damping apparatus cannot cope with a large stroke of vibration. The vibration attenuator should vibrate in a large stroke if the structure vibrates in a large stroke. In other words, when the building (a) vibrates in a large amplitude, the vibration is not damped sufficiently. Further, since a damping coefficient of the damper (h) is constant, the weight (c) may hit the stops (i) when the building (a) vibrates in a large amplitude. This results in a great loss in vibration damping efficiency. Moreover, since the damping coefficient of the damper (h) is not changeable, it is not possible to apply the best damping force to the weight (c). Also, maintenance of the apparatus is not easy.

Another example of the vibration damping apparatuses is disclosed in the U.S. Pat. No. 5,182,887 and two illustrations of this patent are shown in FIGS. 30 and 31 of the accompanying drawings. Referring to FIGS. 30 and 31, a platform 4 is placed on the top of a structure such as a building 1, and a plurality of rolls 6 are placed on the platform 4. On the rolls 6, placed is an arcuate weight 5 which can move in a direction in which the building 1 possibly vibrates. As the building 1 vibrates, the weight 5 is forced to move right and left on the rolls 6. This movement of the weight 5 is controlled by a controlling unit 99 and its associated units such that the weight performs a single harmonic oscillation. As the single harmonic oscillation occurs, the vibration of the building 1 is converted into a kinetic energy of the weight 5. As a result, the vibration of the building 5 is damped. The vibration of the weight 5 is 90-degree delayed from the vibration of the building i to achieve an effective vibration damping. The top face of the weight 5 has a rack 10 which engages with a pinion 13. The pinion 13 is connected with a shaft 12 of a motor 11. The controller 99 which receives a signal from a vibration sensor 3 drives the motor 11, and the motor 11 causes the weight 5 to perform a single harmonic oscillation. The vibration damping apparatus having a vibration damping weight which is forced to move is referred to as an active type. Numerals 8 and 9 designate buffers respectively and numeral 14 designates a weight for adjusting an oscillation period. This vibration damping apparatus 2, however, requires the complicated controller 99 and the separate drive means 11, 12 and 13 to drive the weight 5. Accordingly, it becomes expensive and maintenance is not easy.

SUMMARY OF THE INVENTION

An object of the present invention is to provide a passive vibration damping apparatus of which natural period is easy to adjust.

Another object of the present invention is to provide a passive vibration damping apparatus which can oscillate in a large amplitude.

Still another object of the present invention is to provide a passive vibration damping apparatus which can prevent a damping weight from colliding against stops thereby reducing a loss in vibration damping efficiency.

Yet another object of the present invention is to provide a passive vibration attenuation apparatus which can apply an appropriate braking force to the damping weight.

Another object of the present invention is to provide a passive vibration damping apparatus which has a simple structure.

Another object of the present invention is to provide an inexpensive passive vibration damping apparatus.

Another object of the present invention is to provide a passive vibration attenuation apparatus which can change its posture or direction depending upon a vibration direction of a target structure.

Another object of the present invention is to provide a passive vibration damping apparatus which can automatically hold a damping weight at a particular position even if the damping weight is oscillating.

According to a first aspect of the present invention, there is provided a vibration damping apparatus comprising: a frame having a downwardly arcuate rail plate and two end plates attached at ends of the rail plate; a damping body movably placed on the fall plate; first and second magnets attached to the end plates respectively; and third and fourth magnets attached to the damping body at opposite ends thereof. The frame is firmly placed on a vibrant structure such that it extends in a direction in which the structure possibly vibrates. The rail plate extends in the same direction. The first magnet on one end plate may have the same polarity as the third magnet on one end of the damping body and the second magnet on the other end plate may have the same polarity as the fourth magnet on the other end of the damping body. It should be noted that only first and second cushioning or shock absorbing members may be provided on the end plates and nothing may be provided on the magnet or only third and fourth cushioning members may be provided on opposite end faces of the magnets and no such members may be provided on the end plates.

When the structure vibrates, the frame fixed on the structure also vibrates. This vibration energy is converted to a kinetic energy of the damping body which can move on the rail. As a result, the vibration of the structure is damped. By determining an appropriate radius of curvature of the arcuate rail, the natural period of the damping body is set to be equal to that of the structure. The natural period T is given by the equation $T=2\pi (R/g)^{1/2}$ where R represents a radius of curvature of the rail. Therefore, it is easy to determine the natural period T since it is determined by the radius R. If the natural period of the structure is known, the radius R can be determined, and the damping body will perform a single harmonic oscillation having a natural period determined by the above mentioned R. Since the structure and the damping body resonate with each other, a large stroke of oscillation is achieved. The damping body should vibrate in a large stroke if the structure vibrates in a large stroke. If the damping body oscillates in an excessively large stroke and approaches the end plate, a repulsive force exerted by the two opposed magnets having the same polarity prevents collision of the damping body against the end plates. The vibration damping apparatus of the present invention does not need a mechanical element to adjust the natural period of itself, has a simple structure, and is able to cope with even if a structure vibrates with a large stroke. In addition, preventing the damping body from hitting the end plates reduces a loss in the damping efficiency. Such a magnetic collision avoidance mechanism lasts longer than a mechanical one and its maintenance is also easier. If the shock absorbing members are only provided on the end plates or the damping body, the damping body might collide with the end plates. However, shock upon collision is reduced by the shock absorbing members so that the vibration damping efficiency is not degraded significantly.

According to a second aspect of the present invention, there is provided a vibration damping apparatus comprising: a base frame firmly placed on a vibrant structure; a pair of parallel guide rails firmly attached on the frame, each guide rail being curved downwardly at its center area; a damping body having at least two wheels and movably placed on the rails; a magnetic force generating member (e.g., a magnet) attached to either the damping body or the frame; and a member (e.g., a ferrite plate) attached to either the frame or the damping body to be attracted by the magnetic force of the magnetic force generating member. The magnetic member and the mating member form in combination a magnetic damper or a magnetic brake unit. The magnetic damper may be constituted by magnetic wheels and ferrite guide rails. In this case, the wheels of the damping body function as the magnetic force generating members and the guide rails function as the members to be attracted. Instead of such a magnetic damper, an air resistance member may be provided on the damping body. For instance, a plate may extend from the damping body in a direction perpendicular to a moving direction of the damping body. The air resistance plate may be replaced with a propeller. Both the air resistance plate and the propeller can prevent excessive oscillation of the damping body. It should also be noted that a pair of guide rails may be replaced with a monorail.

When the structure vibrates, the guide rails also vibrate. Energy of this vibration is then converted to a kinetic energy of the damping body so that the vibration of the structure is reduced. A natural period of the damping body is conformed with that of the structure by selecting an appropriate radius of curvature of each guide rail. The magnetic damper suppresses an excessive oscillation of the damping body. If the damping body has magnetic wheels and the guide rails are made from ferrite, instead of having a magnet on a bottom face of the damping body and providing a ferrite plate on the frame, the overall structure of the vibration damping apparatus is simplified. If the monorail is employed instead of a pair of rails, the vibration damping apparatus becomes compact. This vibration damping apparatus does not require a mechanical element to adjust the natural period of itself, has a simple structure and achieves a large stroke of oscillation as well as a large damping effect. Since a magnetic force exerted by the magnetic damper is adjustable, an appropriate braking force is applied to the damping body. The magnetic damper lasts longer, it is easy to vary the braking force and its maintenance is easier than a mechanical damper.

According to a third aspect of the present invention, there is provided an arrangement for holding a damping body of a vibration damping device of a type having a hollow and downwardly curved casing and the damping body movably located inside the casing. The casing generally includes a bottom plate curved downwardly at its center area, lateral walls standing along front and rear longitudinal edges of the bottom plate and a top wall. The damping body may move right and left like a pendulum on the bottom plate or rails laid on the bottom plate. The damping body holding arrangement includes a projection attached to a lateral face, top face or bottom face of the damping body. The projection extends in a direction perpendicular to an oscillating direction of the damping body and has two inclined surfaces extending in the damping body oscillating direction. The horizontal section of the lateral projection or the vertical section of the top or bottom projection is approximately triangular and a recess is formed in a peak area of the triangle. A tubular member penetrates one of lateral walls of the casing in the horizontal direction or the top or bottom wall of the casing in the vertical direction. A stop pin and a spring are placed in the tubular member such that the pin is inwardly biased by the spring and a tip of the pin normally exists inside the casing. When the damping body should move inside the casing, a user or service man pulls the pin out of the casing. A locking mechanism is provided in the vicinity of the tubular member to hold the pin out of the casing. A roller element may be attached to a free end of the pin to prevent wear of a tip of the pin and/or ensure a smooth sliding contact between the free end of the pin and the damping body. If the tubular member for housing the stop pin and the bias spring is mounted on the lateral wall or the bottom wall of the casing, the top wall may not be provided. The projection may be a separate element or an integral part of the damping body.

When the vibration damping apparatus should be stopped for the maintenance service, for example, the damping body inside the casing should also be stopped. Conventionally, a user or service man of the vibration damping apparatus should wait until the damping body naturally stops. However, it takes time, and the damping body might never stop naturally if the vibration damping arrangement is mounted on a boat floating in the water. The present invention provides a simple arrangement for stopping the damping body. To stop the damping body, the pin is unlocked to expose itself into the casing. As the damping body oscillates, the pin contacts the inclined surface of the projection and climbs it. Eventually the pin reaches the top of the projection and drops into the recess of the projection: it is forced into the recess by the spring. When the pin fits in the recess formed in the projection on the damping body, the damping body is no longer able to move. Accordingly, the damping body is automatically trapped. Means for detecting the location of the damping body and/or means for allowing a user or service man to observe the damping body is unnecessary in the present invention. Therefore, the damping body trapping mechanism is manufactured inexpensively. Also, its structure is simple so that maintenance is easy.

According to a fourth aspect of the present invention, there is provided an arrangement for holding a damping body of a vibration damping device of a type having a downwardly curved rail member and the damping body movably located on the rail member. An oscillation track for the damping body is defined by the rail member. The damping body holding arrangement includes a projection attached to an outer surface of the damping body. The projection is a triangular element extending in a direction perpendicular to an oscillating direction of the damping body. A recess is formed at the peak of the triangular projection and two inclined surfaces of the triangular projection extend in the damping body oscillating direction. A plate or angle member is provided on the rail member and a hollow tubular member penetrates this member in a direction perpendicular to the damping body oscillating direction. A stop pin and a spring are provided in the tubular member such that the pin is inwardly biased by the spring and a tip of the pin normally exists over the track. When the damping body should move In the damping weight track, a user or service man pulls the pin out of the track. A locking mechanism is mounted on the tubular member to hold the pin out of the track. A roller element may be attached to a free end of the stop pin to prevent wear of a tip of the pin and/or ensure a smooth sliding contact between the free end of the pin and the damping body. The projection may be a separate element or an integral part of the damping body. If the tubular member for housing the stop pin and the bias spring is mounted on the rail member, the plate or angle member is unnecessary. In this case, the rail member also serves as the plate member. This damping weight holding arrangement operates in a similar manner as that of the third aspect.

BRIEF DESCRIPTION OF THE DRAWINGS

FIG. 4 shows a still another embodiment of the present invention;

FIG. 5A illustrates a modification of a bottom plate or rail plate of the vibration damping apparatus;

FIG. 5B illustrates another modification of the rail plate of the vibration damping apparatus;

FIG. 5C shows another embodiment of the present invention In cross section;

FIGS. 7A to 7G illustrate sectional views of modification of a magnetic damping device respectively;

FIG. 7H illustrates a schematic sectional view of another magnetic damping device employed when a cylindrical damping body moves in a cylindrical frame;

FIG. 8 illustrates a transverse section of a vibration damping apparatus according to another embodiment of the present Invention;

FIGS. 23A and 23B are enlarged sectional views of a part IV of the damping body holding mechanism shown in FIG.

21 respectively: FIG. 23A showing a stop pin which is extended to hold the damping body and FIG. 24B showing the stop pin in a retracted position;

FIG. 24A to FIG. 24C are a series of schematic plan views to illustrating how the damping body is trapped by the holding mechanism: FIG. 24A showing the damping body approaching the stop pin, FIG. 24B showing the damping body contacting the stop pin and FIG. 24C showing the damping body trapped by the stop pin;

FIG. 25 illustrates a schematic top view of a modification of the damping body holding device;

FIG. 28A showing a ball attached to a free end of the pin and FIG. 28B showing a roller attached to the free end of the pin;

DESCRIPTION OF THE PREFERRED EMBODIMENTS

Now, preferred embodiments of the present invention will be described with the accompanying drawings.

Figure 1:
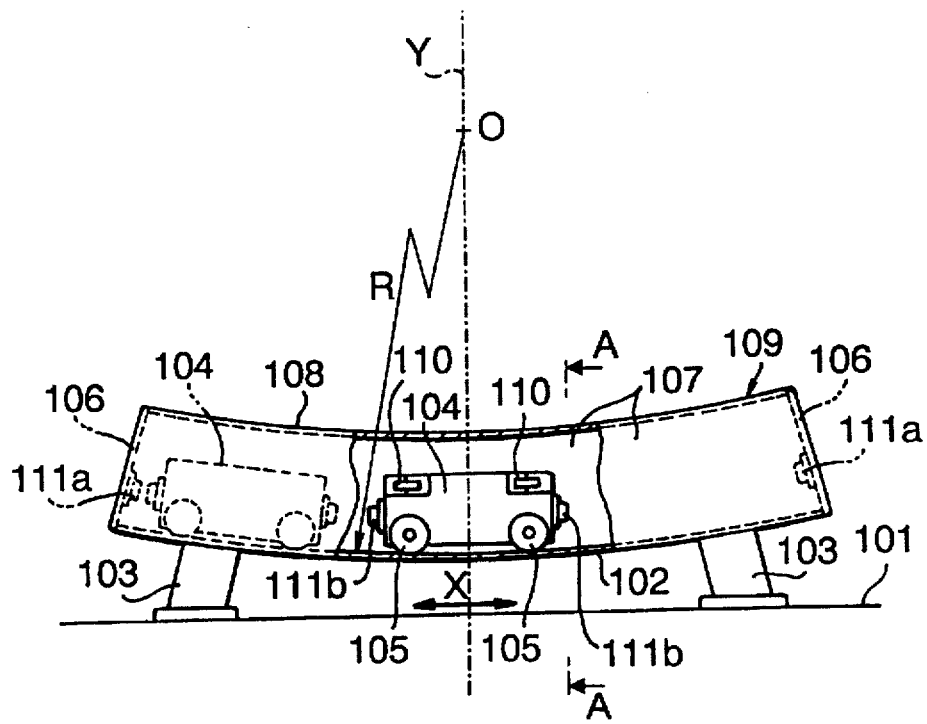
FIG. 1 illustrates a partly sectional front view of a vibration damping apparatus according to a first embodiment of the present invention.
Figure 2:
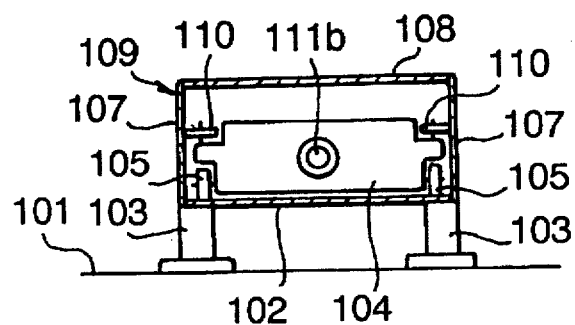
FIG. 2 is a transverse section of the vibration damping apparatus shown in FIG. 1 as taken along the line A—A in FIG. 1.

FIGS. 1 and 2 show a first embodiment of a vibration damping apparatus according to the present invention. On the top of a vibrant structure 101 such as a building, firmly provided is an arcuate rail plate 102 having a predetermined radius of curvature R. The center O of the radius R is positioned above the building 101. The rail plate 102 extends in a direction in which the building 101 most possibly vibrates ("X" directions in FIG. 1). The rail plate 102 has supporting pedestals 103 fixed on the top of the building 101. On the rail plate 102, provided is a damping body (i.e., damping weight or mass) 104 having wheels 105. The damping body 104 is adapted to be able to freely move right and left like a pendulum on the rail plate 102. When the damping mass 104 moves on the rail plate 102, its wheels 105 roll on the fall plate 102. End plates 106 vertically stand at longitudinal ends (or right and left ends in FIG. 1) of the rail plate 102. These end plates 106 are stopper plates for the damping mass 104. Lateral plates 107 vertically stand from front and rear edges of the rail plate 102 (FIG. 2). The space defined by the rail plate 102, the end plates 106 and the lateral plates 107 is closed by a top plate 108. As a result, a hollow box-shaped or hollow elongated rectangular parallelepiped frame 109 is formed. The damping mass 104 reciprocally moves in this frame 109. The damping mass 104 also has side rollers 110 as best seen in FIG. 2. These side rollers 110 roll on the lateral walls 107 when the damping mass 104 oscillates inside the frame 109. The vibration attenuating apparatus of the present invention is a passive vibration attenuating apparatus having the damping mass 104 which naturally moves like a pendulum on the rail plate 102 upon vibrations of the structure 101.

A magnet 111a is attached to an inner face of each end plate 106 and another magnet 111b is attached to each end face of the damping mass 104. A non-magnetic plate may be interposed between a magnet and the plate and between a magnet and the damping mass. In FIG. 1, the magnet 111a on the left end plate 106 has the same polarity of the magnet 111b on the left end face of the damping mass 104, and the magnet 111a on the right end plate 106 has the same polarity of the magnet 111b on the right end face of the damping mass 104. Consequently, if the damping mass 104 oscillates in a large amplitude and approaches one of the end plates 106 of the frame 109, a repulsive force is generated between the two opposed magnets (one on the end plate and one on the damping mass). Therefore, collision of the damping mass against the end plates 106 is prevented. The magnets 111a and 111b form in combination a collision avoidance unit.

The magnets 111a and 111b may be permanent magnets or electromagnets. More than one magnet may be attached to the end plate and the damping mass.

When the structure 101 vibrates upon an external force such as a wind or an earthquake, the frame 109 also vibrates since these are integrated by the pedestals 103. Therefore, energy of the oscillating rail plate 102 of the frame 109 is transmitted to the damping body 104 and the damping body 104 is naturally caused to perform a single harmonic oscillation. This oscillation of the damping body 104 occurs in a 90-degree delayed phase relative to the vibrating structure 101, with the natural period of the damping body being equal to that of the building 101. Therefore, the damping body 104 reciprocally moves on the rail plate 102 in the longitudinal direction of the rail plate 102 with a large stroke and the vibration of the structure 101 is quickly damped.

The structure 101 vibrates in a 90-degree delayed phase relative to the external force, and the damping body 104 vibrates in a 90-degree delayed phase relative to the structure 101. Thus, there is a 180-degree phase difference between the damping body 104 and the external force, and the external force is counterbalanced by the oscillation of the damping body 104 (see FIG. 17).

By appropriately determining the radius of curvature R of the rail plate 102, it is possible to make the natural period of the damping body 104 equal to that of the structure 101. The natural period T of the damping weight is given by the equation $T=2\pi (R/g)^{1/2}$ so that it is determined by the radius R of the rail plate 102. R is obtained if the natural period of the structure 101 is known. The damping body 104 performs a single harmonic oscillation having a natural period determined by this R. The structure 101 and the damping body 104 resonate with each other so that the damping body 104 oscillates in a sufficiently large stroke.

If the attenuation body 104 oscillates in a too large stroke, it may collide with the end plates 106. Such collision greatly degrades the vibration damping efficiency since the attenuation body 104 moves non-linearly and its oscillation does not occur in a desired relationship relative to the oscillation of the structure 101. The vibration attenuation apparatus of the present invention, however, employs the collision avoidance unit (i.e., magnets 111a and 111b mounted on the end plates 106 and the attenuation body 104) so that an appropriate repulsive force is generated between the end face of the attenuation body 104 and the end plate 106 thereby preventing the collision. Accordingly, the vibration attenuation effect is not weakened. Adjustment of the repulsive force is made by changing a magnetic flux produced by the magnets 111a and 111b. If the magnets are permanent magnets, the number of the magnets is increased or decreased. If the magnets are electromagnets, then an excitation current applied thereto is varied. The collision avoidance unit 111a and 111b is a magnetic unit, not a mechanical unit, so that deformations of the unit do not occur and its maintenance is easier.

It should be noted that the magnets 111b may be mounted on a top face or a bottom face of the damping body 104. Likewise, the magnets 111a may be attached to the rail plate 102, the lateral plate 107 or the top plate 108. It should also be noted that the location of the vibration damping apparatus is not limited to the top of the vibrant structure 101 as long as it is deviated from the center of gravity of the structure 101.

Figure 3:
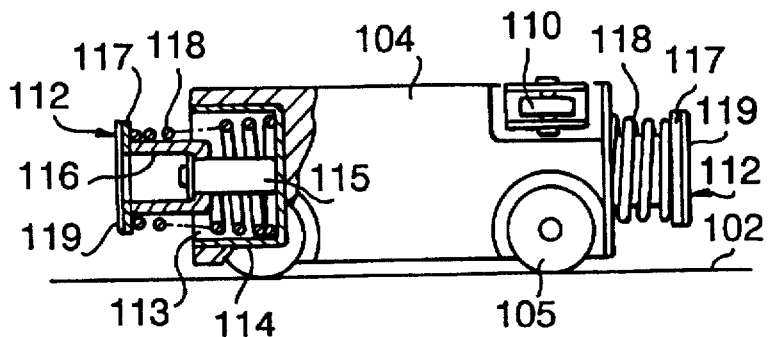
FIG. 3 is an enlarged view of a vibration damping apparatus according to another embodiment of the present invention.

FIG. 3 illustrates another embodiment of the present invention. The vibration damping arrangement of this embodiment is similar to that shown in FIGS. 1 and 2. Instead of providing the magnets 111a and 111b on the end plates 106 and the damping body 104 respectively, cushioning elements 112 are mounted on either the end plates 106 only or the damping body 104 only. FIG. 3 shows the cushioning elements 112 provided on the damping body 104. Each cushioning element 112 includes a cylindrical spring case 114 embedded in one end face of the damping body 104 to form an opening or space 113 in the end face, a fixed center rod 115 extending generally horizontally along a center axis of the spring case 114, a cylindrical plunger 116 slidably fitted over the center rod 115, a coil spring 118 placed between a flange 117 of the plunger 116 and a bottom plate of the spring case 114. The coil spring 118 may be linear or non linear. The plunger 116 is biased outwardly by a resilient force exerted by the coil spring 118. Numeral 119 designates a rubber attached to the exposed face of the plunger 116. The rubber 119 softens shocks and reduces a noise upon contact between metallic members. It should be noted that this rubber 119 may not be provided in a certain application.

No repulsion force is generated until the damping body 104 hits the end plate in the embodiment shown in FIG. 3 so that the damping body 104 may collide with the end plate (or stopper plate) 106 if it oscillates in a large stroke. However, the shock upon the collision is reduced by the cushioning elements 112 so that the vibration damping effect of the vibration damping apparatus is not greatly degraded (or it is maintained in a tolerable level).

FIG. 4 shows a modification of the cushioning element. Instead of the spring cushions 112, rubber cushions or a gel member cushions 120 are attached to the end faces of the damping body 104. A vibration damping effect similar to that of FIG. 3 is achieved.

It should be noted that the cushioning members 112 may be attached to both the end plates 106 and the end faces of the damping body 104.

Figure 15A:
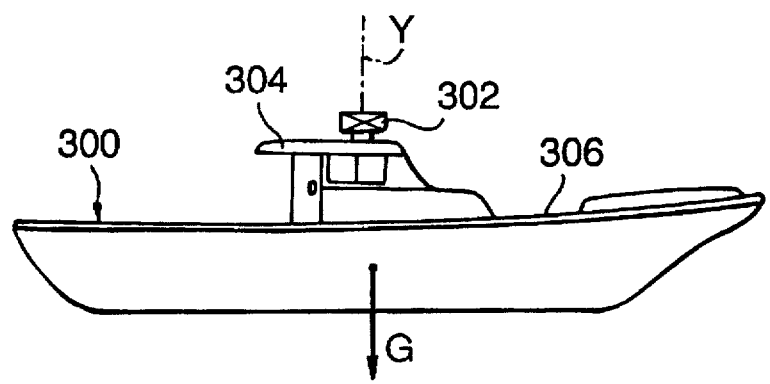
FIG. 15A is a lateral view of the boat similar to FIG. 14B and illustrates the 90-degree rotated vibration damping apparatus.
Figure 15B:
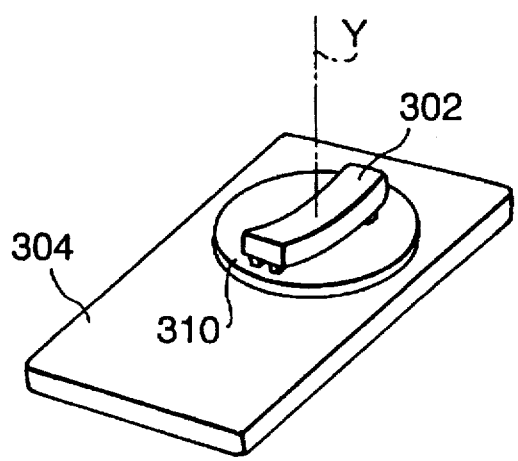
FIG. 15B shows a perspective view of a turntable to rotate the vibration damping apparatus.

It should be noted that the rail plate 102 is not limited to the one having a completely smooth surface shown in FIG. 1 as long as its center area is lower than its ends and ensures a decent oscillating movement of the damping body 104. For example, a rail 102a made from a plurality of straight segments as shown in FIG. 5A and a V-shaped rail 102b made from two curved rail segments as shown in FIG. 5B are satisfactory. In addition, the vibration attenuation apparatus may be adapted to be rotatable about its vertical axis Y on the structure 101 (FIG. 1). In this case, a turntable may be placed between the structure 101 and the vibration attenuation apparatus (FIG. 15B). If the vibration attenuation apparatus is rotatable about the vertical axis Y, it can deal with vibrations in any direction. It should also be noted that the frame may have a tubular shape as depicted in FIG. 5C. This tubular frame 109A has a front view similar to FIG. 1 but its transverse section is circular as illustrated in FIG. 5C. The transverse section of the attenuation body 104A placed inside the frame 109A is also circular. The attenuation body 104A may have a plurality of rollers 105A on its surface so that it can move in the longitudinal direction of the frame 109A (a direction perpendicular to the drawing sheet).

The teaching of the present invention is applicable to any vibrant structure. Various changes and modifications may be made without departing from a spirit and scope of the present invention.

Figure 6A:
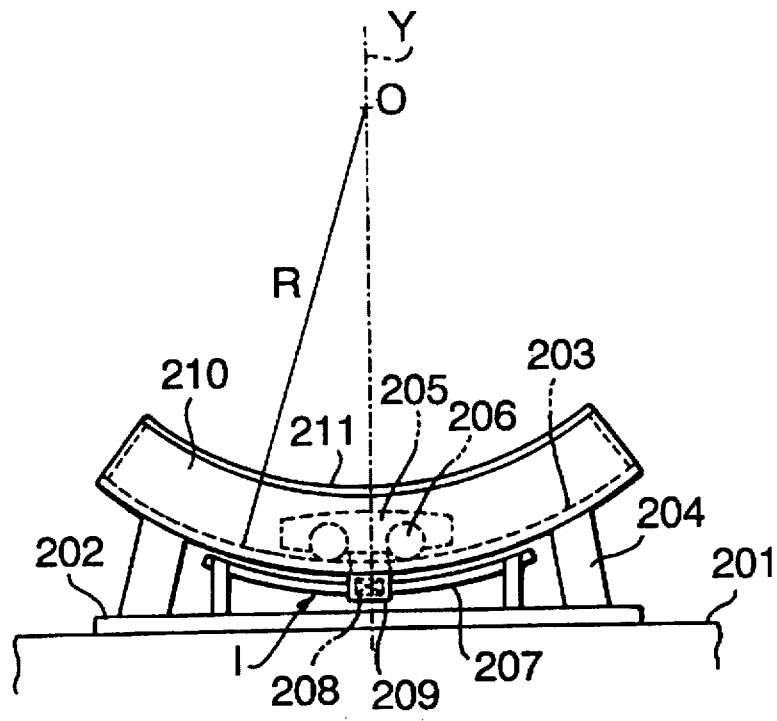
FIG. 6A depicts a front view of a vibration damping apparatus according to another embodiment of the present invention.
Figure 6B:
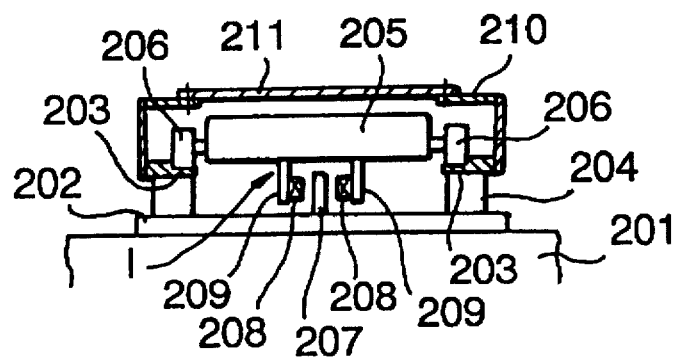
FIG. 6B depicts a transverse section of the vibration damping apparatus shown in FIG. 6A.

FIGS. 6A and 6B illustrate a second embodiment of the vibration attenuation apparatus according to the present invention.

A base frame 202 is fixed on a top of a structure such as a building 201, and a pair of parallel guide rails 203 having pedestals 204 are placed on the base frame 202. Each guide rail 203 is arcuate and has a radius of curvature R. The center of the radius 0 is above the guide rail 203. The longitudinal direction of the rail 203 coincides with a direction in which the building 201 most possibly vibrates. A damping mass 205 having wheels 206 is placed on the guide rails 203. These wheels 206 roll on the guide rails 203 when the damping mass 205 moves. As best seen in FIG. 6B, a plate 207 stands on the base frame 202 between the pedestals 204. Referring to FIG. 6A, the plate 207 has an arcuate upper portion adapted to the curvature of the guide rail 203. Referring again to FIG. 6B, two mounting plates 209 hang from the bottom face of the damping mass 205 and magnets 208 are attached to inner surfaces of the mounting plates 209. The plate 207 is sandwiched by the magnets 209 at a certain clearance. The magnets 208 are magnetic force holding members. The magnets 208 and the plate 207 form in combination a magnetic damper I. In FIG. 6B, an upside-down L-shaped member 210 is connected with an outer edge of each guide rail 203 to define a C-shaped space enclosing each wheel 206. These two members 210 are joined by a top member 211. As illustrated in FIG. 6 each cover 210 has the same length as the guide rail 203 in its front view. The vibration damping apparatus is a passive type: the weight 205 naturally moves right and left on the guide rails 203 upon vibrations of the building 201.

The magnets 208 may be permanent magnets or electromagnets. The number of the magnets 208 may vary depending upon circumstances. The plate 207 may be a copper plate or a ferrite plate.

If the building 201 is vibrated by an external force, the guide rails 203 and the pedestals 204 also vibrate since they are integrated via the base frame 202. Therefore, the oscillating energy of the guide rails 203 is transferred to the damping weight 205 and the weight 205 naturally performs a single harmonic oscillation with the same natural period as the building 201. The damping weight 205 moves like a pendulum on the rails 203 in a large stroke so that the vibration of the building 201 is quickly attenuated.

Figure 17:
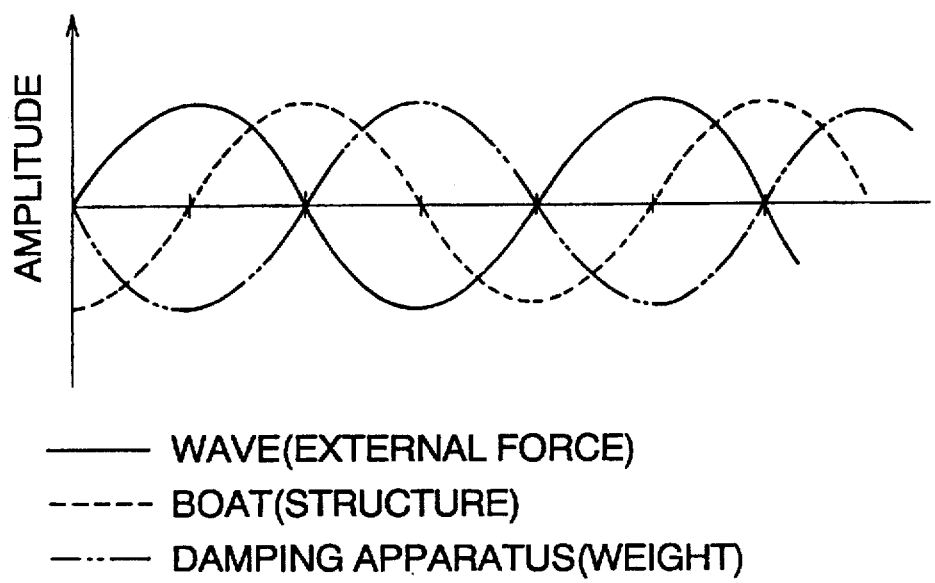
FIG. 17 is a graph showing relationship between the damping body, the boat and an external force.

The structure 201 vibrates in a 90-degree delayed phase relative to the external force. The damping weight 205 vibrates in a 90-degree delayed phase relative to the structure 201. Therefore, there is a 180-degree phase difference between the damping weight 205 and the external force. As a result, the vibration of the external force is counterbalanced by the oscillation of the weight 205 (FIG. 17).

By appropriately determining the radius of curvature R of the guide rail 203, it is possible to set the natural period of the damping weight 205 to be equal to that of the structure 201. The natural period T of the damping body is given by the equation $T=2\pi(R/g)^{1/2}$ so that it is determined by the radius R of the guide rail 203. R is obtained if the natural period of the structure 201 is known. The damping weight 205 performs a single harmonic oscillation having a natural period determined by this R. The structure 201 and the damping weight 205 resonate with each other so that the damping weight 205 oscillates in a sufficiently large stroke.

Figure 13A:
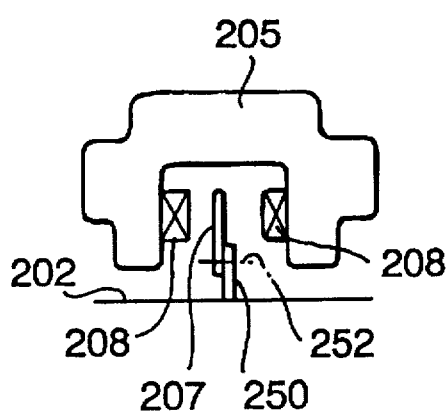
FIGS. 13A and 13B show a modification of a magnetic damping device.
Figure 13B:
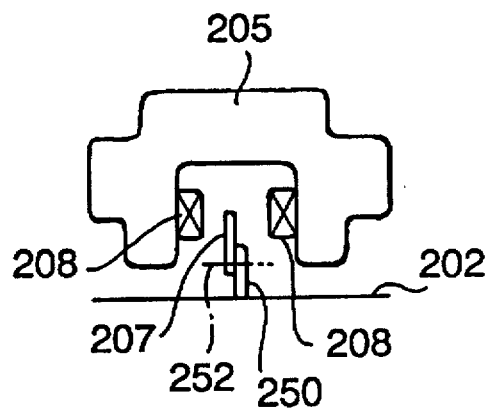

The damping weight 205 might oscillate in a too large stroke since it resonate with the building 201. However, the vibration damping apparatus of the present invention is equipped with the magnetic damper I to prevent an excessive oscillation of the damping weight 205. Specifically, if the magnets 208 generate a magnetic flux and the weight 205 oscillates, the plate 207 attached to the bottom face of the weight 205 passes through the magnetic flux. This movement generates an eddy current in the plate 207 and results in an electromagnetic force (braking force) which is directed to a direction opposite the movement of the plate 207 (Fleming's right hand rule). Therefore, the oscillating movement of the weight 205 is braked and the weight 205 does not move in an over-stroke. The vibration damping apparatus of the present invention can not only reduce the vibration of the building 201 but also restrict the over-stroke of the weight 205. The braking force applied to the damping weight 205 is controlled by adjusting the magnetic flux of the magnets 208. If the magnets 208 are permanent magnets, then the number of the magnets is increased or decreased and/or the relative position of the plate 207 and the magnets 208 is changed. The relative position is how the plate 207 is exposed in the magnetic flux. FIG. 13A shows the plate 207 more exposed in the magnetic flux and FIG. 13B shows the plate 207 less exposed in the magnetic flux. Specifically, the plate 207 is lowered and less area of the plate 207 faces the magnets 208 in FIG. 13B as compared with FIG. 13A. The braking force applied to the plate 207 (i.e., the damping weight 205) is greater in FIG. 13A than in FIG. 13B. Numeral 250 designates a support plate for the plate 207 and numeral 252 designates a pin to hold the plate 207 at a desired height. The location or height of the plate 207 is adjustable by the support 250 and the pin 252. FIGS. 13A and 13B show a weight similar to the one 104 shown in FIG. 2 (wheels 105 and side rollers 110 are omitted). If the magnets 208 are electromagnets, then the excitation current applied thereto is adjusted to control the braking force against the damping weight. Therefore, an appropriate braking force is applied to the damping weight 205. This braking unit I is a magnetic unit, not a mechanical unit, and it has a simple structure so that its maintenance is easier.

It should be noted that the location of the magnets 208 and the plates 207 and 209 of the magnetic damper I is not limited to the one illustrated in FIGS. 6A and 6B. FIGS. 7A to 7G illustrate various modifications of the magnetic damper I. In FIG. 7A, two magnets 208 are attached to front and rear faces of a single plate 209 hanging from the bottom of the weight 205 and are exposed to two plates 207 standing on the base frame 202. In FIG. 7B, a single magnet 208 directly adheres to the bottom of the damping weight 205 and a single plate 207 stands on the base frame 202 below the magnet 208 so that the magnet 208 and the plate 207 vertically face each other. In FIG. 7C, the locations of the magnet 208 and the plate 207 are exchanged from those of FIG. 7B. In FIG. 7D, two plates 209 hang from the bottom of the damping weight 205 and each plate 209 is sandwiched by a pair of magnets 208 attached to support plates 207 standing on the base frame 202. Two sets of magnetic damper I are spacedly provided. In FIG. 7E, two sets of the magnetic damper I shown in FIG. 7A are spacedly provided. In FIG. 7F, one plate 207 hangs from the damping weight 205 and one magnet 208 faces the plate 207. The magnet 208 is attached to a support plate 209 vertically extending from the base frame 202. FIG. 7G shows a modification of FIG. 7F: the location of the magnet 208 and the plate 207 are reversed.

FIG. 7H illustrates a modification of the frame and the attenuation weight. As illustrated, the frame 200 is circular in its transverse section and the attenuation weight 205A is also circular in its transverse section. A magnetic damper I is provided, too. It should be noted that the transverse section of the frame shown in FIG. 6B is substantially rectangular. This rectangle is defined by the base frame 202, the pedestals 204, the guide rails 203, the covers 210 and the top plate 211. The attenuation weight 205 also has a rectangular transverse section in FIG. 6B. In FIG. 7H, a tubular frame 200 is employed and the weight 205A has a shape conforming with the shape of the frame 200. The attenuation weight 205A has, for example, nine rollers 206A (only three are illustrated in FIG. 7H) on its peripheral wall. These rollers 206A contact an inner wall of the tubular frame 200 and allow the attenuation weight 205A to reciprocally move in the tubular frame 200 in the longitudinal direction of the frame 200 (a direction perpendicular to the drawing sheet of FIG. 7H). The magnetic damper I may be any of those illustrated in FIGS. 6B to 7G. In FIG. 7H, employed is a magnetic damper similar to the one depicted in FIG. 6B: two magnets hang from the weight 205A and a single plate 207B is positioned therebetween. It should be noted here that the plate 207B is attached to another plate 207A fixed on the frame 200 and the plates 207A and 207B are joined by a pin 207C. The plate 207B is detachable from the plate 207A so that the height or location of the plate 207B relative to the magnets is adjustable in this embodiment. Changing the relative location of the plate 207B results in change in an eddy current generated in the plate 207B and in turn change in an attenuating force to be generated by the magnetic damper I. A front view of the embodiment shown in FIG. 7H is similar to FIG. 6A. The frame 200 has an arc shape of which center area is lower than ends. The tubular frame 200 makes the vibration damping apparatus compact.

All the embodiments shown in FIGS. 7A to 7H operate in a similar manner as the embodiment of FIGS. 6A and 6B.

It should be noted that in the front view of the vibration damping apparatus, the number of the magnet 208 is only one, as best seen in FIG. 6A. However, there may be provided a plurality of magnets 208 in the longitudinal direction of the rails 203.

FIG. 8 illustrates another modification of the embodiment shown in FIGS. 6A and 6B. Like in FIG. 6B, this vibration damping apparatus has a base frame 202 fixed on a building 201, lateral walls 210, a top cover 211, a pair of parallel guide rails 203 having pedestals fixed on the base frame 202 and a damping weight 205 having wheels 206a and movably placed on the rails 203. The difference is that separate magnets 208 and plates 207 are not provided: the wheels 206a serve as magnets and the rails 203 serve as the plates 207. In other words, the magnetic damper I is formed by the wheels 206a and the guide rails 203 in FIG. 8. This arrangement does not need separate magnets 208 and plates 207 so that the structure of the vibration damping apparatus becomes simpler.

Figure 9:
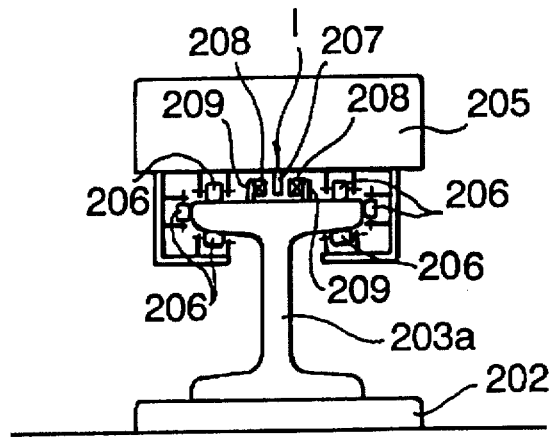
FIG. 9 illustrates a sectional view of another embodiment according to the present invention.

FIG. 9 depicts still another modification of the embodiment shown in FIGS. 6A and 6B. A pair of guide rails 203 in FIG. 6B is replaced with a monorail 203a. A weight 205 having a plurality of wheels 206 rides on the monorail 203a and a magnetic damper I is provided on the bottom of the weight 205. The illustrated magnetic damper I is similar to the one shown in FIG. 7A (locations of the magnets and plate are reversed). It should be noted that the embodiment shown in FIG. 9 may be simplified like the one shown in FIG. 8. Specifically, magnetic wheels 206 may be employed and the monorail 203a may serve as the plate 207. in FIGS. 6A, 6B and 9, similar elements are assigned the same reference numerals. The monorail 203a makes the vibration damping apparatus compact.

Figure 10A:
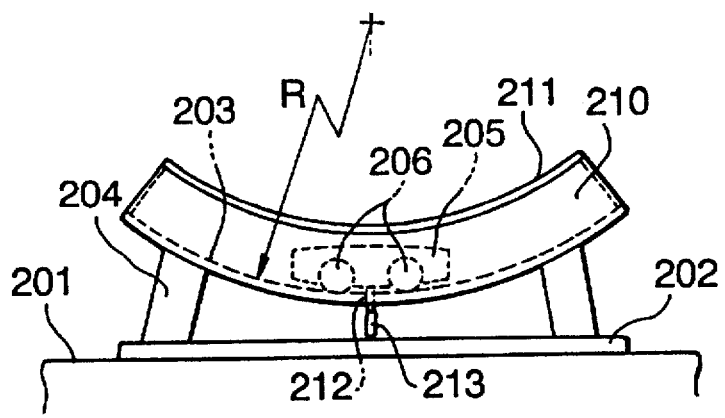
FIG. 10A depicts a front view of a vibration damping apparatus according to another embodiment of the present invention.
Figure 10B:
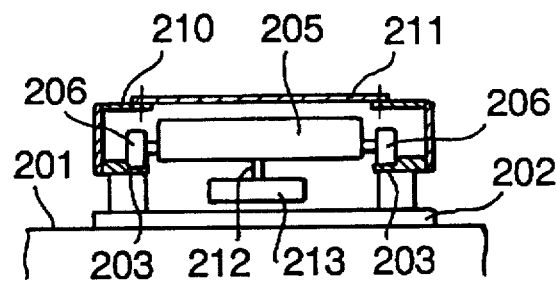
FIG. 10B is a transverse section of the vibration damping apparatus shown in FIG. 10A.

FIGS. 10A and 10B illustrate yet another modification of the embodiment shown in FIGS. 6A and 6B. Instead of the magnetic damper I made from the magnets 208 and the plates 207, an air resistance plate 213 attached to a support element 212 hanging from the bottom of the damping weight 205 is provided. The air resistance plate 213 extends in a direction perpendicular to a direction in which the damping weight 205 moves. In short, an aerophysics damper is used in this embodiment. The air resistance plate 213 prevents the damping weight 205 from oscillating in an over-stroke. An air resistance exerted by the plate 213 is adjusted by changing the shape of the plate 213, increasing/decreasing the number of the plates 213 and/or making an opening in the plate 213. Accordingly, an appropriate damping force can be applied to the damping weight 205.

Figure 11A:
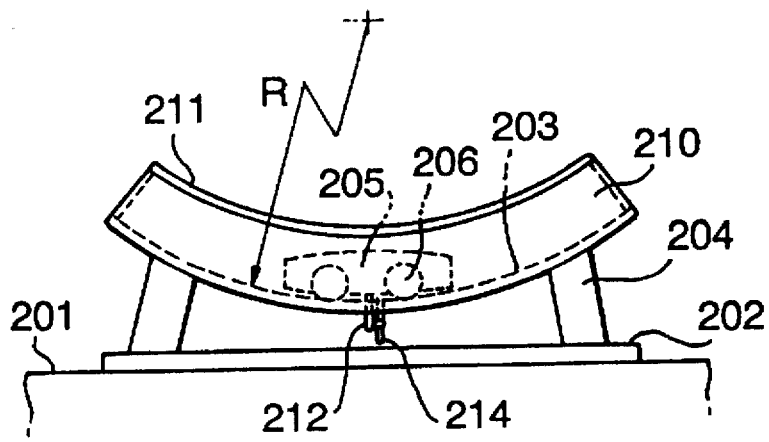
FIG. 11A depicts a front view of a vibration damping apparatus according to another embodiment of the present invention.
Figure 11B:
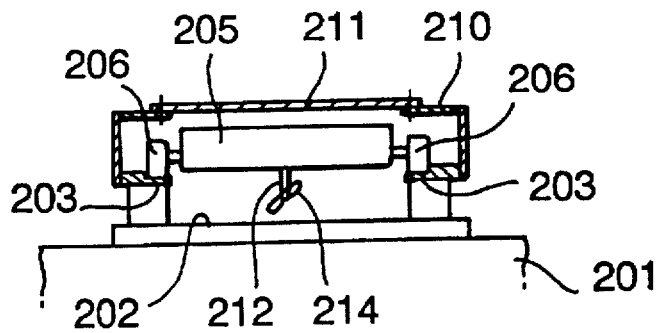
FIG. 11B is a transverse section of the vibration damping apparatus shown in FIG. 10A.

FIGS. 11A and 11B illustrates a modification of the embodiment shown in FIGS. 10A and 10B. Instead of the air resistance plate 213, a propeller or fan 214 is attached to the supporting member 212. As the weight 205 moves, the propeller 214 generates a wind which prohibits the weight 205 from oscillating in an over-stroke. The number of the propellers 214 and/or the shape of the propeller 214 may be changed to control the damping force applied to the weight 205. The propeller 214 may be mounted on an arbitrary part of the weight 205 (e.g., on a top surface of the weight) as long as it does not affect a proper movement of the weight 205 on the rails 203. The propeller 214 may be a variable pitch propeller. In this case, the directions of blades of the propeller 214 are changeable so that the attenuating force is also changeable.

Figures 12A, 12B:
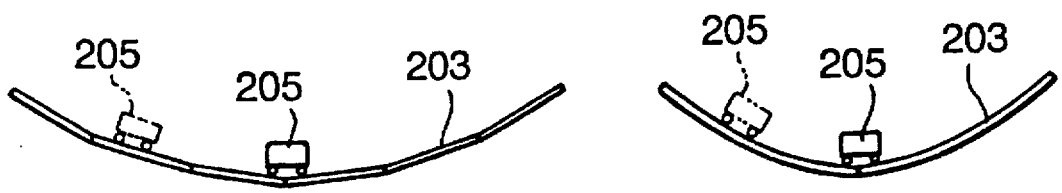
FIG. 12A illustrates a modification of a guide rail plate of the vibration damping apparatus.
FIG. 12B shows another modification of the guide rail plate.

FIGS. 12A and 12B depicts modifications of the guide rails 203. Each guide rail 203 shown in the foregoing embodiments is made from a single element and defines a completely smooth arc, but it may be formed by a plurality of straight segments as shown in FIG. 12A or a pair of arcuate segments as shown in FIG. 12B as long as the weight 205 is able to properly move on the rail 203.

It should be noted that the monorail 203a shown in FIG. 9 may be employed in the embodiments shown in FIGS. 10A and 10B and FIGS. 11A and 11B.

It should also be noted that the vibration attenuation apparatus may be adapted to rotate about its vertical axis Y (FIG. 6A). If desired so, a turntable may be provided between the building 201 and the base frame 202 of the vibration attenuation apparatus (FIG. 15B). With the turntable, the vibration attenuation apparatus can cope with vibrations in any direction by rotating itself about the vertical axis Y.

It should be noted that the vibration attenuation apparatus of the present invention is applicable to any structure other than buildings. It should also be noted that further changes and modifications may be made without departing from a spirit and scope of the present invention.

Figure 14A:
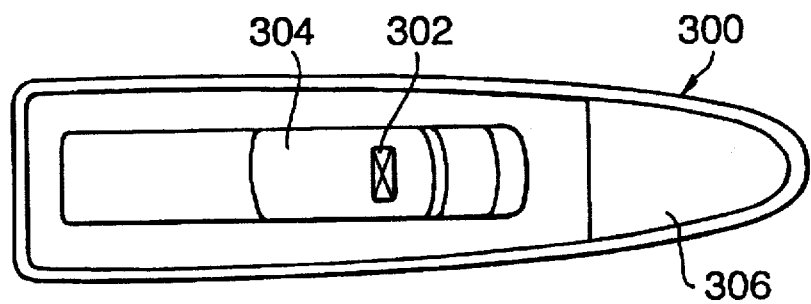
FIG. 14A is a schematic top view of a boat equipped with a vibration damping apparatus of the present invention.
Figure 14B:
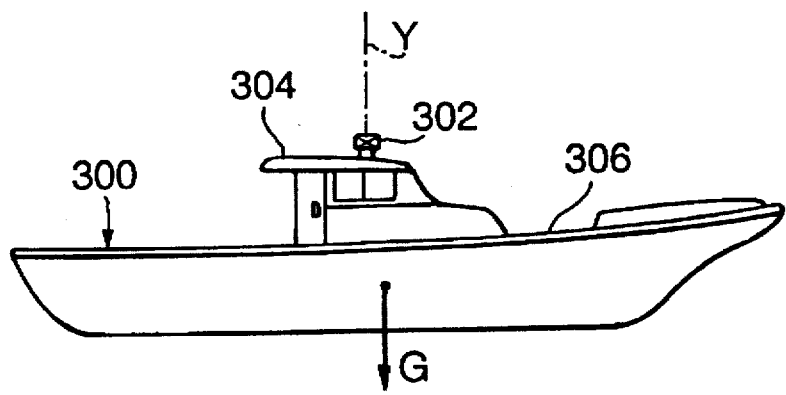
FIG. 14B is a schematic lateral view of the boat with the vibration damping apparatus shown in FIG. 14A.

FIGS. 14A and 14B depict a boat 300 which is equipped with a vibration damping apparatus 302 of the present invention. The vibration damping apparatus 302 may be one of those shown in FIGS. 1 to 13B. In FIGS. 14A and 14B, the vibration damping apparatus 302 is mounted on a roof of a cabin 304 of the boat 300. It should be noted that the location of the vibration damping apparatus 302 is arbitrary as long as it does not coincide with the center of gravity of the boat G. For example, the apparatus 302 may be placed on a bow, a stern, a deck 306 or a bottom of the boat. Generally, the further the location of the vibration damping apparatus from the center of the gravity of the boat G is, the higher the vibration damping effect is, if the damping weight is constant. Also, the vibration damping apparatus 302 does not necessarily position on a longitudinal center line of the boat 300. Specifically, the apparatus 302 may be on a port side or a starboard side. If the vibration damping apparatus 302 is loaded on the boat on its port side, then a counterweight may be placed on the starboard side. The weight of the counterbalance is determined in view of moment balance so that it may be lighter or heavier than the vibration damping apparatus 302 or equal thereto.

The vibration damping apparatus 302 may be turnable about its vertical axis Y. If turnable, the vibration damping apparatus 302 extending in the longitudinal direction of the boat as shown in FIG. 14B may have a posture as shown in FIG. 15A. In order to change the direction of the vibration damping apparatus 302, a turntable 310 (FIG. 15B) is placed between the roof of the cabin 304 and the vibration damping apparatus 302. The vibration damping apparatus 302 is fixed on the turntable 310 and the turntable 310 may be rotatable relative to the roof 304. The turntable 310 enables the vibration damping apparatus 302 to cope with vibrations (waves) in any direction. The turning of the vibration damping apparatus 302 may be done by hands or a known drive mechanism (e.g., hydraulic drive unit). If the turntable 310 should be turned manually, a single opening may be formed in the turntable 310 and a plurality of mating openings may be formed in the roof 304. The openings in the roof 304 may be made in 0, 15, 30, 45, 60, 75 and 90 degree positions relative to the longitudinal direction of the boat 300. A crew on the boat inserts a pin into the opening of the turntable 310 and one of the mating openings of the roof 304 to fix the direction of the vibration damping apparatus 302.

Figure 16:
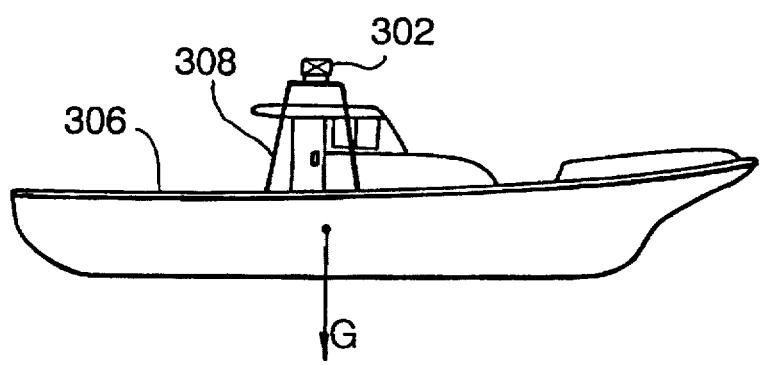
FIG. 16 shows a modification of on-boat installation of the vibration damping apparatus.

It should be noted that the vibration damping apparatus 302 may not be placed on the boat 300 directly. For example, it may be placed on a tower 308 standing on the deck 306 as illustrated in FIG. 16.

FIG. 17 depicts relationship of movement (or oscillation phase) between the vibration damping apparatus (damping weight), the boat (structure) and the waves (external force). In this illustration, the solid line indicates the waves, the broken line indicates the boat and the double-dash line indicates the vibration damping apparatus. As understood from FIG. 17, the boat 302 vibrates in a 90-degree delayed phase relative to the waves, and the vibration damping apparatus 302 vibrates in a 90-degree delayed phase relative to the boat. Therefore, there is a 180-degree phase difference between the waves and the vibration damping apparatus. This means that the vibration damping apparatus 302 vibrates in a phase which counterbalances the waves (external force). As a result, the vibration of the boat is attenuated.

Figure 18A:
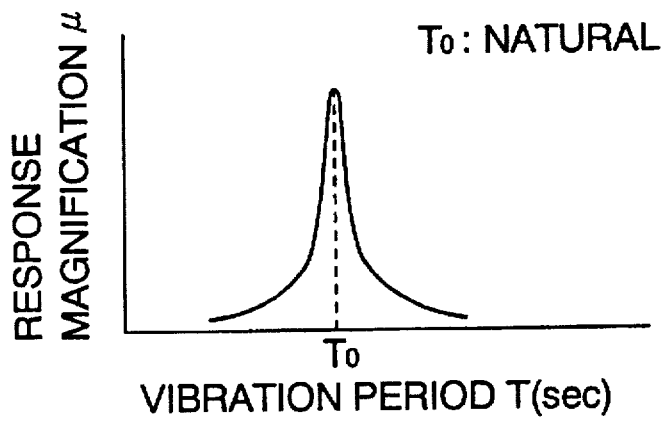
FIG. 18A is a graph showing relation between a response magnification (vibration amplitude ratio) and a vibration period of the boat without the vibration damping apparatus.
Figure 18B:
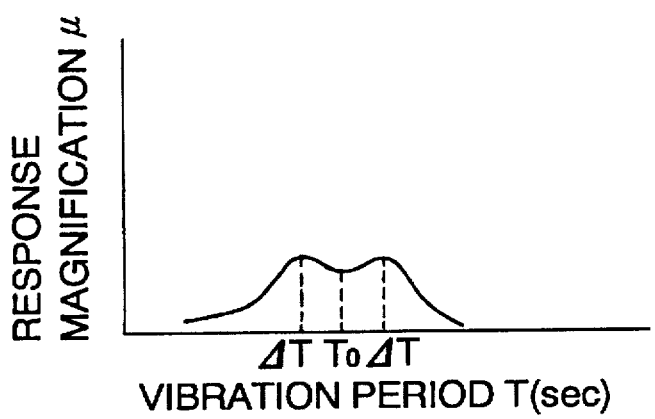
FIG. 18B is a graph showing relation between the response magnification and the vibration period of the boat with the vibration damping apparatus.
Figure 18C:
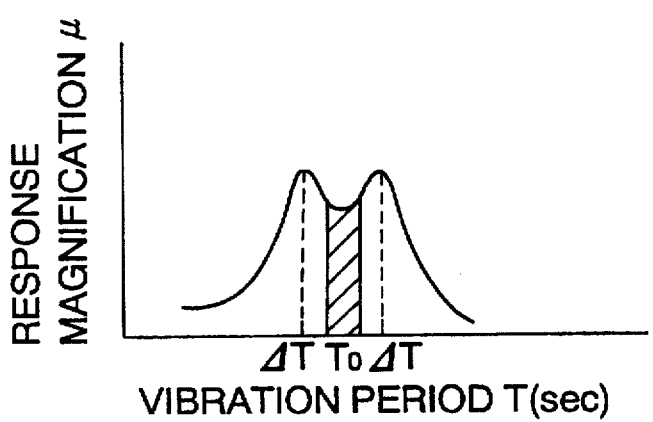
FIG. 18C is a graph showing relation between the response magnification and the vibration period of the boat with the vibration damping apparatus when a natural period of the vibration damping apparatus and that of the boat are set to be the same and the vibration damping apparatus is activated.
Figure 18D:
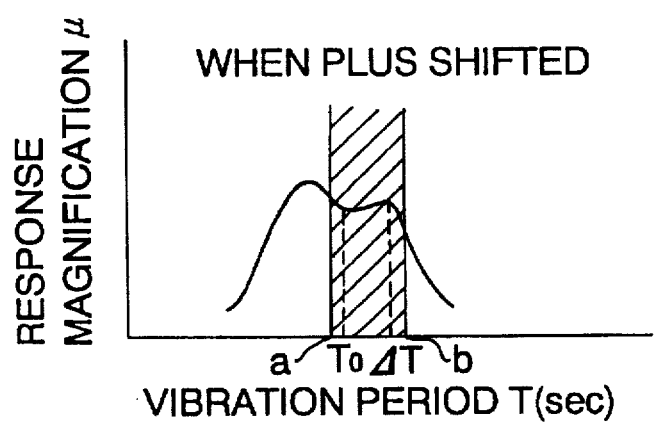
FIG. 18D is a graph showing relationship between the response magnification and the vibration period of the boat when the natural period of the vibration damping apparatus is plus shifted from the natural period of the boat.

In the foregoing, the natural period of the vibration damping apparatus 302 coincides with that of the boat 300. However, if the number of people on the boat 300 should be considered, the natural period of the vibration damping apparatus 302 may be plus shifted by several % to several times ten % from the natural period of the boat. The reason will be described with reference to FIGS. 18A to 18D. The graphs shown in FIGS. 18A to 18D illustrate relationship between a response magnification (amplitude ratio) "mu" of the boat and a vibration period "T" of the boat. The vertical axis indicates the response magnification and the horizontal axis indicates the vibration period. "To" represents a natural period of the boat. The response magnification is a ratio of inclination (i.e., amplitude) of the boat pushed by an external force (waves) having a certain period to inclination of the boat pushed by the same external force having no period. FIG. 18A depicts the relationship between the response magnification and the vibration period of the boat when the boat is not equipped with the vibration damping apparatus of the present invention. In other words, FIG. 18A shows the response magnification of a structure when its number of degree of freedom in vibrations is one. Thus, the curve of response magnification has only one peak. FIG. 18B illustrates the response magnification curve when the boat is equipped With the vibration damping apparatus. If the vibration damping apparatus is loaded on the boat, the number of degree of freedom of the total system becomes two according to a physical law. Therefore, the response magnification of the boat has two peaks as illustrated in FIG. 18B. Further, if the natural period of the boat and that of the vibration damping apparatus are the same, the response magnification of the boat draws the curve as depicted in FIG. 18C. Specifically, if the boat is provided with the vibration damping apparatus and the vibration damping apparatus is actuated having the same natural period as the boat, then the response magnification of the boat has a sufficiently low area around To as indicated by oblique lines. The response magnification has a least value at To. This means that the vibration of the boat is suppressed enough in the oblique area and the vibration damping apparatus effectively functions in this range. At±delta T from To (or at two peaks of the curve), the response magnification has two maximum values and the vibration damping apparatus cannot demonstrate a satisfactory damping effect. If the natural period of the vibration damping apparatus is plus shifted, the response magnification curve changes its shape as illustrated in FIG. 18D. Specifically, the right peak of the curve shown in FIG. 18C is flattened and the oblique area (i.e., effective range of the vibration damping apparatus) is widened as compared with FIG. 18C. Accordingly, shifting the natural period of the vibration attenuation apparatus to the plus side results in broadening the effective range of the vibration attenuation apparatus. FIG. 18D illustrates the curve when people are boarding the empty boat. As the people board the boat, the natural period of the boat is plus shifted and the response magnification of the boat changes from the one shown in FIG. 18C to the one shown in FIG. 18D. As understood from FIG. 18D, the response magnification varies between the points "a" and "b". Therefore, even if the number of persons on the boat changes, the effective range of the vibration attenuation apparatus never becomes smaller than that shown in FIG. 18C. Accordingly, it is preferred to beforehand plus shift the natural period of the vibration damping apparatus from that of the boat by several % to several times ten %.

Practically, it is preferred that the weight of the vibration damping apparatus be about 1.5% to about 2.0% of displacement of the boat. For example, if the displacement of the boat is two tons, the weight of the vibration damping apparatus is about 30 to 40 kg.

Figure 19:
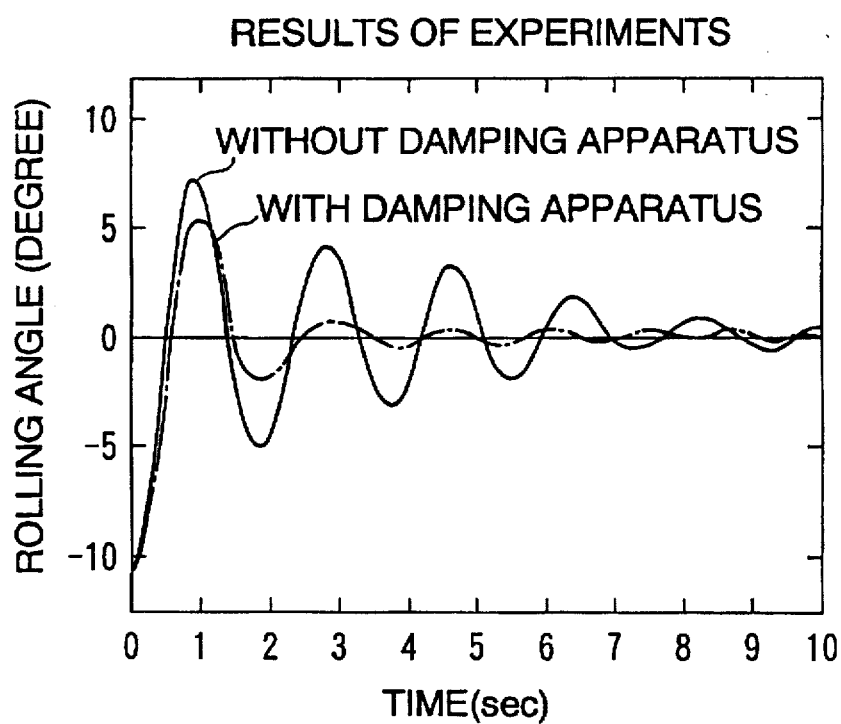
FIG. 19 illustrates results of experiments to show how much rolling of the boat is reduced if the boat is equipped with the vibration damping apparatus of the present invention.

FIG. 19 illustrates results of experiments on rolling of the boat equipped with the vibration damping apparatus of the present invention. The solid line indicates the rolling when the vibration damping apparatus was not driven whereas the single dot line indicates the rolling when the vibration damping apparatus was driven. In this experiment, the boat's displacement was 2.5 tons, its length was 25 feet, the vibration damping apparatus weighed 76 kg, its length was 1,280 mm, its width was 340 mm and its height was 360 mm.

FIG. 20 to 23B illustrate an embodiment of a damping weight holding mechanism for a vibration damping apparatus having an oscillatable weight.

The above-described vibration damping apparatuses according to the present invention use a damping weight performing a single harmonic oscillation. In order to stop the vibration damping apparatus for activation of a structure (e.g., boat) or for maintenance of the vibration damping apparatus, for example, a damping weight should be stopped. Conventionally, the damping weight is held in the following manner: a through hole is formed in a wall of a damping weight casing at its approximate center, a mating recess is formed in a surface of the damping weight, a service man or crew waits until the weight naturally stops at the center of the casing (the lowest point of the track of the weight defined in the casing), and then the service man inserts a pin into the recess. A damping weight observation window or means for detecting a location of the damping weight is also provided since the damping weight casing is a generally closed casing. With this conventional mechanism, however, the service man should wait until the structure naturally becomes stationary. It is practically impossible or very dangerous to insert the stop pin toward the moving damping weight. However, the structure equipped with the vibration damping apparatus may be moving due to winds and/or waves. Particularly, if the structure is a boat on the sea, the weight hardly stops by itself. The weight on the boat should be held to ensure proper navigation of the boat during cruising.

The present invention provides an automatic weight holding mechanism which is even able to trap the oscillating weight.

Figure 20:
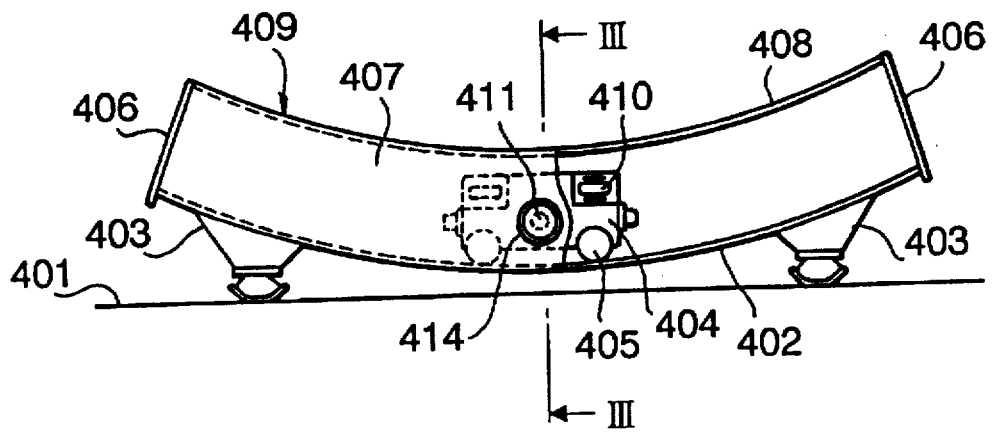
FIG. 20 illustrates a partly sectional front view of a damping body holding mechanism for a vibration damping apparatus according to the present invention.
Figure 21:
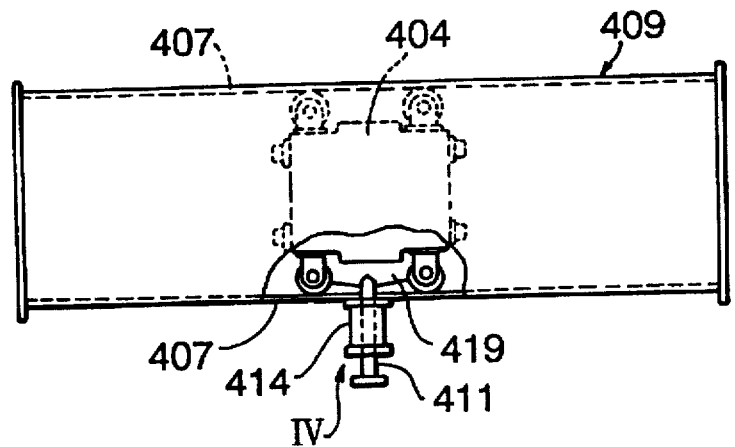
FIG. 21 illustrates a partly sectional top view of the damping body holding mechanism shown in FIG. 20.

Referring to FIGS. 20 and 21, a vibration attenuating apparatus is provided on a top of a structure 401. The vibration attenuating apparatus has a downwardly arcuate casing 409 and a damping weight 404 movably placed inside the casing 409. The casing 409 includes a downwardly arcuate bottom plate or rail plate 402, front and rear plates 407, a top plate 408 and end plates 406. The damping weight 404 moves right and left in FIG. 20 like a pendulum as the structure 401 vibrates. The longitudinal direction of the casing 409 coincides with the direction in which the structure 401 most possibly vibrates. The bottom plate 402 has a predetermined radius of curvature. The casing 409 has pedestals 403 fixed on the structure 401. The end plates 406 serve as stop plates. It should be noted that if the bottom plate 402 and lateral walls 407 are sufficiently long, the end plates 406 may not be provided. The damping body 404 has wheels 405 on its bottom which roll on the bottom plate 402. The damping body 404 also has side wheels 410 on its lateral faces which roll on the lateral plates 407 of the casing 409.

Figure 22:
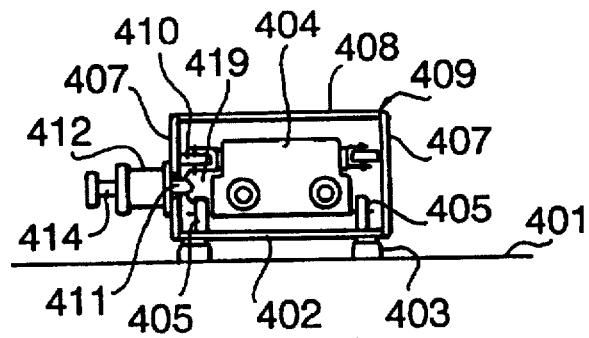
FIG. 22 is a sectional view taken along the line III—III of FIG. 20.

Referring further to FIGS. 22, 23A and 23B, a through hole 412 is formed in the front wall 407 of the casing 409 at an approximate center of the front wall 407 and a stop pin 411 fits in the hole 412 such that the inner free end of the stop pin 411 normally exists inside the casing 409. The stop pin 411 extends in a direction perpendicular to the lateral wall 407 and is movable in the same direction. A cylindrical case 414 is attached to an outer surface of the lateral wall 407 and the pin 411 extends through the cylindrical casing 414. A spring 415 (FIG. 23A) is placed in the pin casing 414 so that the stop pin 411 is normally biased into the damping weight casing 409. The pin casing 414 has an end plate 414a and the stop pin penetrates an opening of the end plate 414a. This opening has a notch or cut off portion 416. The stop pin 411 has a mating projection 417 which operatively fits in the notch 416. When the stop pin 411 should be retracted from the casing 409 to allow the damping weight 404 to oscillate in the casing 409, the service man pulls the stop pin 411 against the biasing force exerted by the spring 415 until the tip of the stop pin 411 is out of the casing 409. During this operation, the projection 417 on the stop pin 411 moves through the notch 416. The projection 417 is formed at a root portion of the stop pin 411. When the service man pulls the stop pin 411, then he turns the stop pin about its longitudinal axis so that the pin rests on the outer surface of the end plate 416 of the cylindrical case 414 (FIG. 23B). In the retracted position, the stop pin 411 is firmly retained since the spring 415 exerts a retaining force. Therefore, the stop pin 411 is not forced into the damping weight casing 409 until an unlocking force is intentionally applied to the stop pin 411. The projection 417, the notch 416 and the end plate form in combination a pin locking mechanism. If the damping weight 404 should be stopped, then the stop pin 411 is unlocked (FIG. 23A).

Referring to FIG. 23A, the lateral wall 407 of the damping weight casing 409 has the opening 412 and this side of the damping weight 404 has a block element or projection 419 which horizontally projects toward the stop pin 411. The horizontal section of the projection 419 is generally triangular as understood from FIG. 23A. The projection 419 has inclined surfaces 419a extending in the oscillating direction of the damping weight 404. At the top or peak of the triangular projection 419, formed is a recess 418 which receives the stop pin 411. When the stop pin 411 fits in the recess 418, the damping weight 404 is held. How the stop pin 411 is trapped in the recess 418 will be described with reference to FIGS. 24A to 24C.

When the vibration damping apparatus should be actuated and the damping weight 404 should be able to move freely, the stop pin 411 is pulled out of the casing 409 and locked in the retracted position (FIG. 23B).

When the damping weight 404 should be stopped for maintenance, for instance, the stop pin 411 is unlocked so that it projects in the casing 409. The stop pin 411 is forced into the casing by the spring 415. If the damping weight 404 is already stationary due to its gravity, the stop pin 411 is received in the recess 418 so that the damping weight 404 cannot move any more. If the damping weight 404 is oscillating and moving toward the center of the casing 409 as illustrated in FIG. 24A, the inclined surface 419a of the projection 419 attached to the lateral surface of the damping weight 404 eventually contacts the free end of the stop pin 411 (FIG. 24B). Then, the tip of the stop pin 411 slides on the inclined surface 419a (or climbs the inclined surface 419a toward the recess 418) as the damping weight 404 further moves. During this operation, the stop pin 411 is resiliently pushed back in its longitudinal direction against the biasing force as indicated by the downwardly directed arrow in FIG. 24B. When the tip of the stop pin 411 reaches the top of the projection 419, the stop pin 411 is forced into the recess 418 by the force of the coil spring 415 as shown in FIG. 24C or 24A. At this position, the damping weight 404 is stopped by the stop pin 411.

In this manner, simply allowing the stop pin 411 to project in the damping weight casing 409 results in automatic holding of the oscillating damping weight 404. Therefore, means for watching or detecting the position of the damping weight unnecessary.

It should be noted that the position of holding the attenuation weight 404 is not limited to the center of the bottom plate 402. For example, the attenuation weight 404 may be stopped near one of the end plates 406 of the casing 409 as illustrated in FIG. 25. Specifically, the oscillating attenuation weight 404 may be trapped at its stroke end. In such a case, the opening 412 is formed in the front wall 407 of the casing 409 near the end plate 406 and the projection 419 having only one slope 419a is mounted on the front surface of the attenuation weight 404. The slope 419a is formed on the side of the end plate 406 or the outer side of the recess 418 since the inner slope is unnecessary. The embodiment shown in FIG. 25 operates and holds the attenuation weight 204 like the embodiment shown in FIGS. 20 to 24C.

This embodiment may be particularly advantageous if applied to a relatively small boat. Generally the smaller boat cannot install the vibration damping apparatus on its center line due to its size (i.e., the vibration damping apparatus is located on the port side or the starboard side). The damping weight 404 may be held at its right stroke end or starboard side if the vibration damping apparatus is located on the port side. This makes the center of gravity of the vibration damping apparatus as close as possible to the center line of the boat and in turn results in better balancing of the cruising boat. The projection 419 may be a separate block which is mounted on the damping weight after manufacturing of the damping weight or it may be an integral part of the damping weight which is formed together with the damping weight. The top plate 408 of the casing 409 may not be provided.

Figure 26:
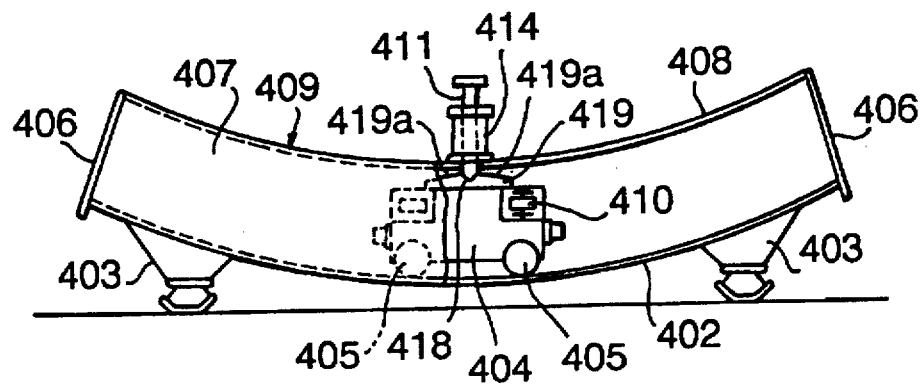
FIG. 26 illustrates a partly sectional view of another modification of the damping body holding device.

FIG. 26 illustrates a modification of the damping weight holding mechanism according to the present invention. The generally triangular block 419 having the recess 418 at its top and the two slopes 419a is mounted on a top surface (or a bottom surface) of the damping weight 404 and the stop pin 411 with its locking mechanism is provided on a corresponding position. This modification operates like the foregoing embodiments.

Figure 27A:
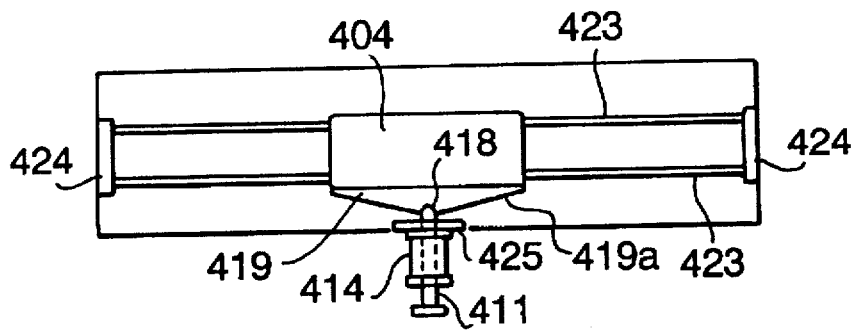
FIG. 27A illustrates a top view of still another modification of the damping body holding device.
Figure 27B:
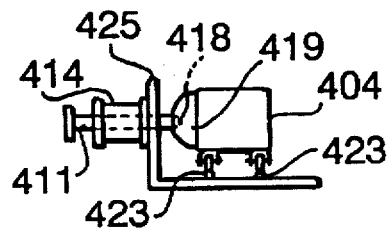
FIG. 27B depicts an end view of the damping body holding device shown in FIG. 27A.

FIG. 27 illustrates another modification of the damping weight holding mechanism. This weight holding mechanism is applied to a vibration damping structure having a different arrangement as compared with that shown in FIG. 20 or 26. A pair of downwardly arcuate parallel rails 423 is located on a downwardly arcuate bottom plate 422 and a damping weight 404 having wheels is loaded on these rails 423. The damping weight 404 oscillate on the rails 423 in the longitudinal direction of the rails. End members 424 are provided at longitudinal ends of the rails 423 to prevent the damping weight from falling off the rails 423. These stops 424 may not be provided if the rails 423 are sufficiently long. The damping weight 404 has a block 419 on its front face. The block 419 has a recess 418 and two slopes 419a. A bracket 425 stands from the bottom plate 422 at the front edge center of the bottom plate 422. A stop pin 411 and its locking mechanism are mounted on the bracket 425. The stop pin 411, its locking mechanism, and how the damping weight 404 is stopped by the stop pin 411 are the same as in the embodiment shown in FIG. 20. If the block 419 is mounted on the top surface of the damping weight 404, an L-shaped or U-shaped bracket may be used. If the block 419 is mounted on a bottom surface of the damping weight 404, no bracket may be provided and the pin 411 is provided on the bottom plate 422. A monorail may be employed instead of the pair of rails 423.

Figure 28A:
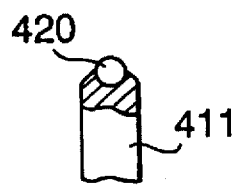
FIGS. 28A and 28B illustrate modifications of the stop pin of the damping body holding device respectively.
Figure 28B:
Figure 29:
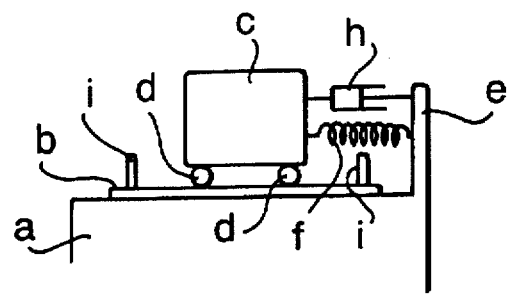
FIG. 29 schematically illustrates one example of conventional vibration damping apparatuses.
Figure 30:
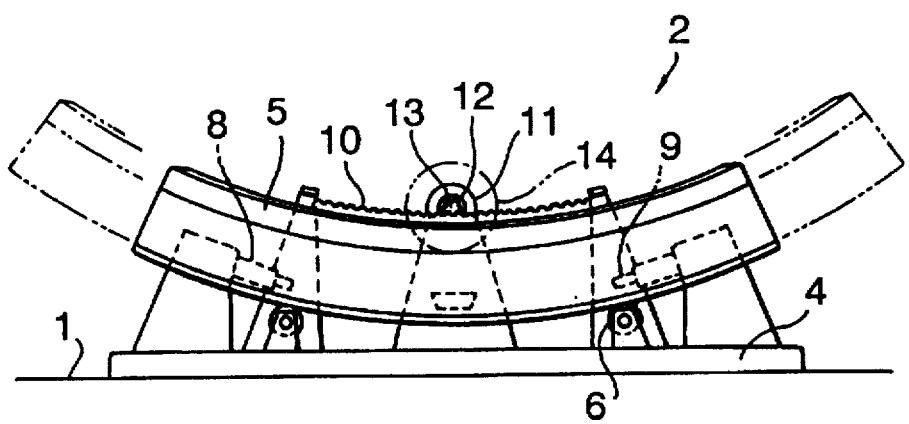
FIG. 30 is a front view of another conventional vibration damping apparatus.
Figure 31:
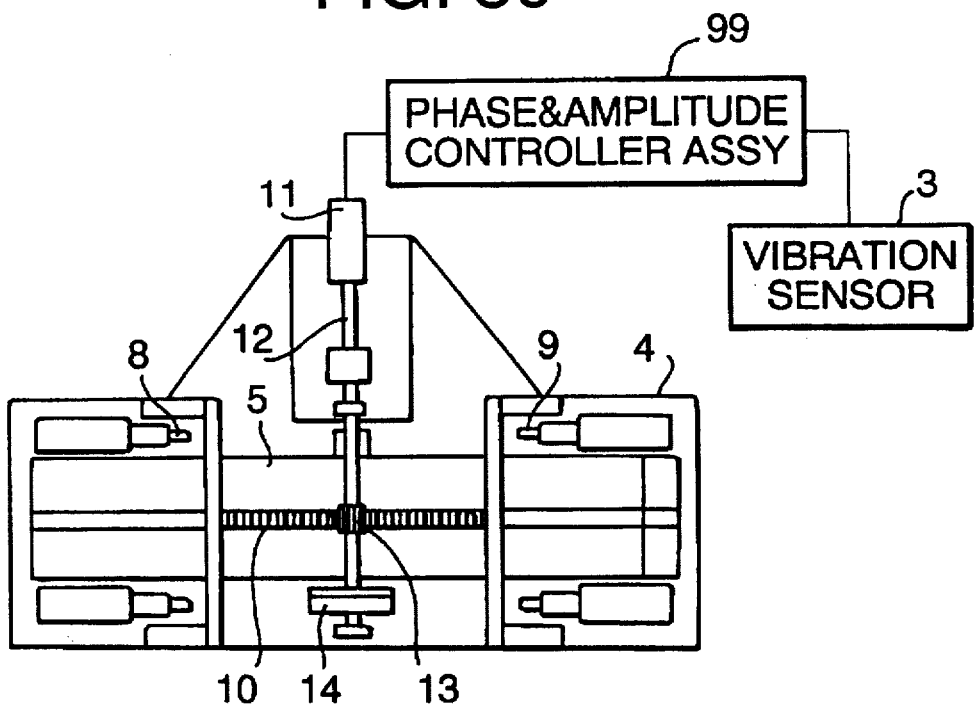
FIG. 31 is a schematic top view of the vibration damping apparatus shown in FIG. 30.

FIGS. 28A and 28B illustrate examples of a free end of the stop pin 411 respectively. A ball bearing 420 may be attached to the free end of the stop pin 411 as shown in FIG. 28A or a roller 421 may be mounted at the free end of the stop pin 411. A rolling element such as the ball bearing 420 and the roller 421 prevents wear of the free end of the stop pin 411 upon contact with the slope 419a of the projection 419 on the damping weight 404 and ensures a smooth sliding movement of the free end of the stop pin 411.

It should be noted that the location of trapping the attenuation weight 404 can be determined arbitrarily, that the horizontal cross section of the projection 419 is not limited to the triangle (e.g., it may be pentagonal or semicircular), the recess 418 may be formed in the slope 419a, not at the top of the projection, and that the slope 419a may have a curved surface. Further, the locking mechanism for the stop pin 411 may be constituted by an opening formed in the pin 411 and a locking pin to be inserted in this opening.

What is claimed is:

1. A vibration damping apparatus, comprising:
    means for defining a downwardly arcuate oscillation track, the oscillation track defining means having first and second longitudinal ends and being located on a vibrant structure, the oscillation track having a longitudinal direction;
    first and second end plates respectively provided at the longitudinal first and second ends of the oscillation track defining means;
    a vibration damping body movably located on the oscillation track such that it can naturally oscillate on the oscillation track in the longitudinal direction of the oscillation track upon vibrations of the structure, the damping body having first and second end faces in the longitudinal direction of the oscillation track, and the first end face being directed to the first end plate and the second end face being directed to the second end plate;
    first and second magnets mounted on the first and second end plates, respectively; and
    third and fourth magnets mounted on the first and second end faces of the damping body, respectively, the first and third magnets having the same polarity and the second and fourth magnets having the same polarity, whereby a repulsion force decelerating the damping body is generated between the first and third magnets and between the second and fourth magnets when the vibration damping body nears the respective end plate.

2. A vibrating damping apparatus, comprising:
    means for defining a space for oscillation, the oscillation space being downwardly arcuate and having a longitudinal direction, the oscillation space defining means being fixed on a vibrant structure and having an opening;
    a vibration damping body movable in the oscillation space such that it can naturally oscillate in the oscillation space in the longitudinal direction of the oscillation space upon vibration of the structure, the damping body having an outer surface;
    a projection formed on the outer surface of the damping body, the projection extending in a first direction perpendicular to the direction in which the damping body oscillates, the projection having a peak and at least one slope inclined to the outer surface of the damping body, the slope extending to the outer surface of the damping body in the oscillation direction of the damping body;
    a recess formed at the peak of the projection;
    a stop pin movable in the first direction;
    a pin casing mounted on the oscillation space defining means for housing the stop pin;
    a spring placed in the pin casing for biasing the stop pin toward the damping body in the first direction; and
    a locking mechanism for holding the stop pin out of the oscillation space to allow the damping body to freely oscillate in the oscillation space, the stop pin being forced to project into the oscillation space through the opening in the oscillation space defining means upon unlocking the pin, the stop pin being directly received in the recess of the projection formed on the damping body if the recess overlaps the opening at the time of unlocking the pin, the stop pin climbing the slope of the projection and being eventually received in the recess if the recess does not overlap the opening at the time of unlocking the pin.

3. The vibration damping apparatus of claim 2, wherein the projection is formed on a lateral surface, a top surface or a bottom surface of the vibration damping body.

4. A vibration damping apparatus comprising:
    means for defining a downwardly arcuate oscillation space, the oscillation space defining means being fixed on a vibrant structure, the oscillation space having a longitudinal direction;
    a vibration damping body movably located in the oscillation space such that it can naturally oscillate in the oscillation space in the longitudinal direction of the oscillation space upon vibrations of the structure, the damping body having an outer surface;
    a projection formed on the outer surface of the vibration damping body, the projection extending in a first direction perpendicular to the direction in which the damping body oscillates, the projection having a peak and at least one slope inclined to the outer surface of the damping body, the slope extending to the outer surface of the vibration damping body in the oscillating direction of the damping body;
    a recess formed at the peak of the projection;
    a stop pin movable in the first direction;
    a member for movably supporting the stop pin, the support member having an opening;
    a pin casing mounted on the support member for housing the stop pin;
    a spring placed in the pin casing for biasing the stop pin toward the damping body in the first direction; and
    a locking mechanism for holding the stop pin out of the oscillation space to allow the damping body to freely oscillate in the oscillation space, the stop pin being forced to project in the oscillation space through the opening of the support member upon unlocking the stop pin, the stop pin being directly received in the recess of the projection formed on the damping body if the recess overlaps the opening at the time of unlocking the stop pin, the stop pin climbing the slope of the projection and being eventually received in the recess if the recess does not overlap the opening at the time of unlocking the stop pin.

5. The vibration damping apparatus of claim 4, wherein the projection is formed on a lateral surface, a top surface or a bottom surface of the vibration damping body, and the oscillation space defining means serves as the support member if the projection is formed on the bottom surface of the vibration damping body.

6. The vibration damping apparatus of claim 2, 3, 4 or 5, further including a rolling element at a free end of the stop pin.

7. The vibration damping apparatus of claim 2, 3, 4 or 5, wherein the projection has an approximate isosceles triangular cross section in the first direction and the recess is formed at a peak of the triangle.

8. The vibration damping apparatus of claim 2, 3, 4 or 5, wherein the pin casing is provided near one of the longitudinal ends of the oscillation track.

9. The vibration damping apparatus of claim 1, 2, 3, 4 or 5, wherein a natural period of the vibration damping apparatus is shifted from a natural period of the structure by a predetermined amount.

10. The vibration damping apparatus of claim 9, wherein if the structure is a boat, the natural period of the vibration damping apparatus is plus shifted from the natural period of the boat.

11. The vibration damping apparatus of one of claims 1, 2, 3, 4, 5, 6, 7, 8, 9 or 10, further including means for causing the longitudinal direction of the oscillation track or the oscillation space to coincide with a direction in which the structure vibrates.

12. The vibration damping apparatus of claim 11, wherein the direction coinciding means is a turntable provided between a bottom of the vibration damping apparatus and a top of the structure.

13. The vibration damping apparatus of claim 1, wherein the oscillation track defining means includes a rail plate, a pair of parallel rails or a monorail to define the oscillation track.

14. The vibration damping apparatus of claim 2, 3, 4 or 5, wherein the oscillation space defining means includes a rail plate, a pair of parallel rails or a monorail.

15. The vibration damping apparatus of claim 2, 3, 4 or 5, wherein the oscillation space defining means is a plate member, an L-shaped angle member, a U-shaped member, a rectangular parallelepiped member or a tubular member elongated in the longitudinal direction of the oscillation track.

16. A vibration damping apparatus, comprising:
means for defining a downwardly arcuate oscillation track, the track defining means having longitudinal ends and being located on a vibrant structure, the oscillation track having a longitudinal direction;
end plates respectively provided at the longitudinal ends of the oscillation track defining means;
a vibration damping body movably located on the oscillation track such that it can naturally oscillate on the oscillation track in the longitudinal direction of the oscillation track upon vibrations of the structure, the damping body having opposite end faces in the longitudinal direction of the oscillation track; and
first and second spring members mounted on the end plates, respectively, or on the opposite end faces of the damping body, respectively.

17. A vibration damping apparatus, comprising:
means for defining a downwardly arcuate oscillation track, the track defining means having longitudinal ends and being located on a vibrant structure, the oscillation track having a longitudinal direction;
end plates respectively provided at the longitudinal ends of the oscillation track defining means;
a vibration damping body movably located on the oscillation track such that it can naturally oscillate on the oscillation track in the longitudinal direction of the oscillation track upon vibrations of the structure, the damping body having opposite end faces in the longitudinal direction of the oscillation track; and
first and second rubber members mounted on the end plates, respectively, or on the opposite end faces of the damping body, respectively.

18. The vibration damping apparatus of claim 2, wherein the oscillation space defining means is made from a material which is attracted by a magnetic force and the vibration damping body is made from a material which generates the magnetic force.

19. The vibration damping apparatus of claim 4, wherein the oscillation space defining means is made from a material which is attracted by a magnetic force and the vibration damping body is made from a material which generates the magnetic force.

20. The vibration damping apparatus of claim 2, further including an air resistance member mounted on the vibration damping body such that it generates a braking force against movement of the vibration damping body.

21. The vibration damping apparatus of claim 4, further including an air resistance member mounted on the vibration damping body such that it generates a braking force against movement of the vibration damping body.

22. A vibration damping apparatus, comprising:
means for defining a downwardly arcuate oscillation track, the track defining means being located on a vibrant structure, the oscillation track having a longitudinal direction;
a vibration damping body having wheels and movably located on the oscillation track such that it can naturally oscillate on the oscillation track in the longitudinal direction of the oscillation track upon vibrations of the structure;
a first plate downwardly hanging from the vibration damping body;
a first magnet mounted on the first plate; and
a second plate upwardly standing from the structure and extending in parallel to the first plate such that it faces the first magnet at a predetermined clearance, whereby a brake force is applied to the first magnet and in turn to the first plate as well as the vibration damping body when the first magnet on the first plate moves near the second plate upon oscillation of the vibration damping body.

23. The vibration damping apparatus of claim 20 or 21, wherein the air resistance member is a plate or a propeller.

24. The vibration damping apparatus of claim 23, wherein the oscillation track defining means is a plate member, an L-shaped angle member, a U-shaped member, a rectangular parallelepiped member or a tubular member elongated in the longitudinal direction of the oscillation track.

25. The vibration damping apparatus of claim 22, further including:
a third plate downwardly hanging from the vibration damping body, the third plate extending in parallel to the second plate on the opposite side as viewed from the first plate; and
a second magnet mounted on the second plate such that the first and second magnets sandwich the second plate.

26. The vibration damping apparatus of claim 25, further including:
a second magnet mounted on an opposite face of the first plate; and
a third plate upwardly standing from the structure, the third plate extending in parallel to the first plate on the opposite side as viewed from the second plate such that it faces the second magnet at a predetermined clearance.

27. The vibration damping apparatus of claim 26, further including:
a fourth plate downwardly hanging from the vibration damping body;

third and fourth magnets mounted on opposite faces of the fourth plate; and fifth and sixth plates upwardly standing from the structure such that they face the third and fourth magnets, respectively, at a predetermined clearance.

28. A vibration damping apparatus, comprising:

means for defining a downwardly arcuate oscillation track, the track defining means being located on a vibrant structure, the oscillation track having a longitudinal direction;

a vibration damping body having wheels and movably located on the oscillation track such that it can naturally oscillate on the oscillation track in the longitudinal direction of the oscillation track upon vibrations of the structure;

a first plate downwardly having from the vibration damping body;

a second plate upwardly standing from the structure and extending in parallel to the first plate; and a first magnet mounted on the second plate such that it faces the first plate at a predetermined clearance so that a brake force is applied to the first plate and in turn to the vibration damping body when the first plate moves near the first magnet on the second plate upon oscillation of the vibration damping body.

29. The vibration damping apparatus of claim 28, further including:

a third plate upwardly standing from the structure on the opposite side of the first plate as viewed from the second plate; and a second magnet mounted on the third plate such that the first and second magnets sandwich the first plate.

30. The vibration damping apparatus of claim 29, further including:

a fourth plate downwardly hanging from the vibration damping body;

fifth and sixth plates upwardly standing from the structure such that they sandwich the fourth plate; and third and fourth magnets mounted on the fifth and sixth plates, respectively, such that they face opposite faces of the fourth plate.

31. The vibration damping apparatus of claim 2, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
first and second magnets mounted on the first and second end plates, respectively; and
third and fourth magnets mounted on the first and second end faces of the vibration damping body, respectively, the first and third magnets having the same polarity and the second and fourth magnets having the same polarity.

32. The vibration damping apparatus of claim 4, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
first and second magnets mounted on the first and second end plates, respectively; and
third and fourth magnets mounted on the first and second end faces of the vibration damping body, respectively, the first and third magnets having the same polarity and the second and fourth magnets having the same polarity.

33. The vibration damping apparatus of claim 2, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
first and second cushioning members mounted on the first and second end plates, respectively, or on the first and second end faces of the vibration damping body, respectively.

34. The vibration damping apparatus of claim 4, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
first and second cushioning members mounted on the first and second end plates, respectively, or n the first and second end faces of the vibration damping body, respectively.

35. The vibration damping apparatus of claim 2, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
magnetic braking means for applying a brake force to the vibration damping body, the magnetic braking means including a magnetic force generating member mounted on the vibration damping body or the oscillation space defining means and an associated member mounted on the oscillation space defining means or the vibration damping body to be attracted by a magnetic force of the magnetic force generating member.

36. The vibration damping apparatus of claim 4, wherein the oscillation space defining means has first and second end plates at ends of the oscillation space in the longitudinal direction of the oscillation space and the vibration damping body has first and second end faces in the longitudinal direction of the oscillation space, and the vibration damping apparatus further includes:
magnetic braking means for applying a brake force to the vibration damping body, the magnetic braking means including a magnetic force generating member mounted on the vibration damping body or the oscillation space defining means and an associated member mounted on the oscillation space defining means or the vibration damping body to be attracted by a magnetic force of the magnetic force generating member.

37. The vibration damping apparatus of one of claims 16 to 36, wherein a natural period of the vibration damping apparatus is shifted from a natural period of the structure by a predetermined amount.

38. The vibration damping apparatus of claim 37, wherein if the structure is a boat, the natural period of the vibration damping apparatus is plus shifted from the natural period of the boat.

39. The vibration damping apparatus of one of claims 16 to 36, further including means for causing the longitudinal direction of the oscillation track or the oscillation space to coincide with a direction of vibration of the structure.

40. The vibration damping apparatus of claim 39, wherein the direction coinciding means is a turntable provided between a bottom of the vibration damping apparatus and a top of the structure.

* * * * *